(12) United States Patent
Nicole

(10) Patent No.: US 11,684,071 B2
(45) Date of Patent: Jun. 27, 2023

(54) SYSTEM AND METHOD FOR POST-HARVEST TREATMENT OF VEGETABLES AND FRUITS

(71) Applicant: PHILIPS LIGHTING HOLDING B.V., Eindhoven (NL)

(72) Inventor: Celine Catherine Sarah Nicole, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 1013 days.

(21) Appl. No.: 15/768,207

(22) PCT Filed: Oct. 12, 2016

(86) PCT No.: PCT/EP2016/074437
§ 371 (c)(1),
(2) Date: Apr. 13, 2018

(87) PCT Pub. No.: WO2017/064109
PCT Pub. Date: Apr. 20, 2017

(65) Prior Publication Data
US 2018/0310578 A1 Nov. 1, 2018

(30) Foreign Application Priority Data

Oct. 14, 2015 (EP) .................................... 15189764
May 20, 2016 (EP) .................................... 16170642

(51) Int. Cl.
*A23B 7/015* (2006.01)
(52) U.S. Cl.
CPC .................... *A23B 7/015* (2013.01)

(58) Field of Classification Search
CPC .................................................... A01G 7/045
See application file for complete search history.

(56) References Cited

U.S. PATENT DOCUMENTS 3,578,464 A * 5/1971 Mpelkas ................ A23B 7/015
426/248
2005/0165499 A1 7/2005 Stein
(Continued)

FOREIGN PATENT DOCUMENTS

| GB | 2402037 A | 12/2004 |
|---|---|---|
| JP | 2012070727 A | 4/2012 |

(Continued)

OTHER PUBLICATIONS

Purple-Black Tomatoes, Tomatofest. Accessed Mar. 4, 2021. <https://www.tomatofest.com/Purple_Black_Heirloom_Tomatoes_s/30.htm#:~:text=Some%20of%20our%20most%20popular,Purple%20Russian%20and%20Pruden's%20Purple.&text=Purple%20variety%20of%201884%20has,purple%20color%20and%20dusky%20shoulders.> (Year: 2021).*

(Continued)

*Primary Examiner* — Nviren A Thakur
*Assistant Examiner* — Thanh H Nguyen

(57) ABSTRACT

Vitamin C is one of the nutrient for which health claims are allowed. Tomato is, after onion, the most produced and consumed vegetable in the world. It is also for a number of country a very important crop. Increasing vitamin C in tomato can have major health impact. Vitamin C can be increasing with light during the growth of tomato. Disclosed are more practical solutions to increase the vitamin C during transport or storage, simplifying the process and allowing a better logistic in the tomato food chain.

9 Claims, 16 Drawing Sheets

(56) References Cited

U.S. PATENT DOCUMENTS

| | | | | |
|---|---|---|---|---|
| 2014/0215910 A1* | 8/2014 | Suzuki | ............ | A01G 7/045 47/58.1 LS |
| 2014/0311359 A1 | 10/2014 | Lee | | |
| 2016/0178179 A1* | 6/2016 | Hanson | ............ | A01G 7/045 362/249.02 |

FOREIGN PATENT DOCUMENTS

| | | |
|---|---|---|
| UA | 25767 U | 8/2007 |
| WO | 2014037860 A1 | 3/2014 |
| WO | 2015150091 A1 | 10/2015 |

OTHER PUBLICATIONS

Nicholl, An Introduction to Genetic Engineering, Cambridge University Press, Third Edition, p. 265 (Year: 2008).*

Veillet, S., et al., "Aceptability and Antioxidant Properties of a Semi-Dried and Smoked Tomato Product," Journal of Food, Agriculture & Environment, vol. 7 (2), 2009 (6 Pages).

Yahia, E., et al., "Ascorbic Acid Content in Relation to Ascorbic Acid Oxidase Activity and Polyamine Content in Tomato and Bell Pepper Fruits During Development, Maturatiion and Senescence," Food Science and Technology, Academic Press, 2001 (6 Pages).

Verkerke, W., et al., "The Effect of Light Intensity and Duration on Vitamin C Concentration In Tomato Fruits," Acta Horticultural, International Society for Horticultural Science, 2015 (5 Pages).

Di Matteo, A., et al., "The Ascorbic Acid Content of Tomato Fruits is Associated With the Expression of Genes Involved in Pectin Degradation," BMC Plant Biology 2010 (11 Pages).

Massot, C., et al., "Fluctuations in Sugar Content Are Not Determinant in Explaining Variations in Vitamin C in Tomato Fruit," Plant Physiology and Biochemistry, 2010 (7 Pages).

Zushi, K., et al., "Light Intensity Modulates Antioxidant Systems in Salt-Stressed Tomato (*Solanum lycopersicum* L. Cv. Micro-Tom) Fruits," Scientia Horticulturae, 2014 (8 Pages).

* cited by examiner

SYSTEM AND METHOD FOR POST-HARVEST TREATMENT OF VEGETABLES AND FRUITS

CROSS-REFERENCE TO PRIOR APPLICATIONS

This application is the U.S. National Phase application under 35 U.S.C. § 371 of International Application No. PCT/EP2016/074427, filed on Oct. 12, 2016, which claims the benefit of European Patent Application Numbers 15189764.2, filed on Oct. 14, 2015 and 16170642.9, filed on May 20, 2016. These applications are hereby incorporated by reference herein.

FIELD OF THE INVENTION

The present invention relates to a system and a method for post-harvest treatment of vegetables and fruits, especially fruits such as tomatoes. More specifically, the present invention relates to increasing vitamin C concentration in vegetables and fruits via a post-harvest light treatment. The invention also provides such vegetables or fruits, especially tomatoes, such as obtainable with the herein described method.

BACKGROUND OF THE INVENTION

Methods for enhancing the nutritional value in an edible plant part by light are known in the art. US2015/0223402, for instance, describes a method for enhancing the nutritional value in a first plant part of a crop, wherein the first plant part comprises an edible plant part, wherein the crop in addition to the first plant part comprises one or more other plant parts, wherein the method comprises illuminating during a nutritional enhancement lighting period a target part of said first plant part with horticulture light that is selected to enhance formation of a nutrient in said first plant part while allowing one or more other plant parts to be subjected to different light conditions, wherein the nutritional enhancement lighting period is started within two weeks from harvest of the first plant part.

SUMMARY OF THE INVENTION

Vitamin C (L-ascorbic acid; AsA), a compound essential for human health (anti- and prooxidant), is found in considerable amounts in field grown tomato fruit (10-20 mg/100 g of fresh weight). Tomato is not only an important horticultural crop but also a significant source of AsA for humans. AsA is one of the few phytochemicals for which health claims have been accepted (EFSA Panel on Dietetic Products, 2010). Long known beneficial effects for the human immune system are corroborated by recent studies that show the potential for cancer prevention and treatment. Even in developed societies AsA is currently in insufficient amounts in the diet. Therefore, there is interest in improving AsA levels of plants and plant products.

Emerging technologies in modern agriculture set the scene for developing specialised plant products. Lighting conditions can be easily manipulated in protected cultivation (e.g. LEDs) and used to improve quality of plant products. Light is a major regulatory factor for AsA levels in leaves and fruits.

AsA found in tomato fruit is both locally synthesized and may be imported from mature leaves.

Light quality may increase the amount of health related phytochemicals in fruits, creating an added value for the customer. Vitamin C, or L-ascorbic acid, is a compound which concentration appears to increase upon light illumination. The mechanism of light enhancement of vitamin C is not fully understood and is under investigation. A greenhouse experiment has been conducted successfully to enhance L-ascobic acid in tomato truss using special lighting device around the tomato. This experiment proved that the vitamin C can be significantly enhanced during a post-harvest treatment and that the higher the light level the higher the vitamin C concentration.

The stage of fruit development at harvest is one of the major factors determining the health quality of fruit because there is an important change in the profile of antioxidants during ripening. Fruit ripened on the plant generally has higher phytonutrient content than table-ripened fruit ("Tomato (*Solanum lycopersicum*) health components: from the seed to the consumer", Dorais, Martine, David L. Ehret, and Athanasios P. Papadopoulos, Phytochemistry Reviews 7.2 (2008): 231-250). Tomato fruit harvested green or at the breaker stage and ripened to table-ripeness contained less ascorbic acid than fruit ripened on the vine ("Accumulation and Loss of Sugars and Reduced scorbic Acid in Attached and Detached Tomato Fruits", Luis A. Betancourt et al, J. Amer. Soc. Hort. Sci. 102(6): 721-723, 1977). However, Dumas et al. (2003) reported that ascorbic acid was or was not affected by the ripening stage at harvest, depending of the cultivar studied ("Review Effects of environmental factors and argicultural techniques on antioxidant content of tomatoes", J. Sci. Food Agric. 83:369-382, 2003).

In addition, positive correlations were observed between fruit sugar content and vitamin C and lycopene content. This may imply that increasing Vitamin C will be beneficial for the sugar content and lycopene, and therefor has an influence on the organoleptic properties of the fruit.

The research done in the past 3-4 years was targeted at enhancing vitamin C in greenhouse tomato production using LED lighting. The experiments done with light cuvettes arranged around truss tomatoes in pre-harvest production stages were interesting for the investigation but may not constitute a practical solution. Furthermore, harvested vine riped tomatoes are vulnerable to transport damage and may result in significant losses in the retail and logistic food chain.

The herein disclosed post-harvest light treatment seeks to solve some of the problems identified in the prior art and/or other problems. For instance, increasing the vitamin C content for fruit, such as tomatoes, may take a relative long time under natural conditions. However, vitamin C generation in fruits, such as tomatoes, under greenhouse conditions may be lower than under sunlight conditions. Yet further, there is a desire to transport unripe fruit, as unripe fruit is in general less sensible than ripened fruit. Hence, it is an aspect of the invention to provide an alternative harvesting and/or post harvesting method, which preferably further at least partly obviate(s) one or more of above-described drawbacks.

Amongst others, the invention proposes a way to get in an easy way fruit, such as, tomato, with guaranteed high vitamin C content (such as above about 50 mg/100 mg). To achieve this, the tomato fruit should be harvested when green and when it reached a maximum size. The tomato is placed under LED lighting until it gets red. This may apply to other types of fruit as well.

The harvesting stage is relevant as the increase of vitamin C may be much lower if the fruit has already started to ripen.

For a given cultivar this knowledge could be achieved with a calibration procedure on the size of the fruit and its color and firmness measurement.

Another aspect of the invention is that the harvest may especially not be done per truss but per individual fruit, such as individual tomato, as on a truss there is a slight delay in the developmental stage (of all the tomato). The tomato closer to the stem develops earlier than at the end of the truss. This might increase slightly the hand work but this could be not a real inconvenient in countries where tomatoes are sold individually packed. In addition, a machine equipped with a camera measuring size and color might do this job easily scanning the tomato to be harvested.

The good size green tomatoes may then be placed on a tray in a lighting unit (while being transported or stored waiting for the auction). The lighting unit may in embodiments operate about 96-240 hours, such as especially 4 to 7 days to increase significantly the vitamin C. Hence, according to an aspect of the disclosed post-harvest treatment, tomato fruit is harvested when green and when it reached a predetermined size. The harvested tomato is then illuminated with light having an intensity of at least about 150 $\mu mol \cdot s^{-1} \cdot m^{-2}$ for in embodiments—about 96-192 hours, such as especially about 4 to 7 days (i.e. 96-168 hours). During this treatment, the vitamin C concentration of the tomatoes may increase to above about 25 mg/100 g fresh weight, such as even at least about 30 mg/100 g fresh weight, like even at least about 40 mg/100 g fresh weight, such as to above about 50 mg/100 g fresh weight. At the same time the tomato is coloring an will turn red.

Therefore, in a first aspect the invention provides a method of ripening a piece of fruit, the method comprising:
- providing an unripe piece of fruit (especially detached from a plant);
- irradiating at least part of the piece of fruit with radiation with a predetermined minimum radiation intensity and during a predetermined radiation period;
- wherein
- in specific embodiments at least 90% of the total number of photons of the radiation are in the range of 380-800 nm, wherein less 10% of the total number of photons of the radiation are in the range of 700-800 nm, and wherein at least 10% of the total number of photons together provide a white light component of the radiation;
- wherein—in specific embodiments—in average over the predetermined radiation period the predetermined intensity is at least 100 $\mu mol/m^2/s$ for the piece of fruit, and wherein in specific embodiments the predetermined radiation period is at least 48 hours.

It appears that with such method, the advantages of firm unripe fruit e.g. for transportation, can be combined with ripening the fruit, and even ripening the fruit such that a high vitamin C content can be achieved. The vitamin C content even appeared to be higher for a number of tomato types investigated than grown naturally (here: outdoor grown with solar light). Hence, the present method of irradiation may also be used to enhance the vitamin C content and/or content of other useful compounds in the fruit. With the present invention, early picking and lighting during transport and/or storage may lead to a ripened fruit that is substantially equal in taste and/or quality as naturally ripened fruit. However, the vitamin C content and/or content of other useful compounds in the fruit may thus be higher than naturally ripened fruit. The present method may also solve problems with horticulture grown tomatoes or other fruit that may be deficient vitamin C content and/or content of other useful compounds.

Harvested green tomatoes are much more firm and can handle transport much better. Light can also be applied during transport or just at the arrival at the auction within a ripening cell like this is done for other fruits like bananas, avocados etc., except that the tomato would need some high light level. The ripening process can be measured easily with color analysis.

The harvesting stage seems crucial as the increase of vitamin C will be much lower if the fruit has already started to ripen. For a given cultivar this knowledge could be achieved with a calibration procedure on the size of the fruit and its colour and firmness measurement.

An other aspect of the invention is that the harvest should—in specific embodiments—not be done per truss (herein also indicated as "cluster") but per individual tomato as on a truss there is a slight delay in the developmental stage of all the tomato (see also above). The tomato closer to the stem may develop earlier than at the end of the truss. This might increase slightly the hand work but this could be not a real inconvenient in countries where tomatoes are sold individually packed. In addition, a machine equipped with a camera may be applied (see above). In yet other embodiments, the tomatoes may be picked from the plant as cluster. After the cluster has been detached from the plant, the individual tomatoes may be removed from the cluster. Removing individual tomatoes from the plant may be more time consuming but may also allow not detaching tomatoes that should grow some further time.

The above may also apply to other types of fruit. Hence, in embodiments the fruit is a cluster fruit, and the unripe piece of fruit is provided detached from a cluster. As indicated above, this may imply detaching the cluster (from the plant) and then detaching the tomato or other fruit from the cluster or this may imply detaching individual tomatoes or other pieces of fruit from the plant. The invention is not limited to cluster fruits such as tomatoes. The piece of fruit especially refers to to fruit selected from the group consisting of a tomato, an apple and a bell pepper.

The tomato is an edible, often red berry-type fruit of the nightshade *Solanum lycopersicum*. Examples of the tomato include beefsteak tomatooes, oxheart tomatoes, plum tomatoes, pear tomatoes, campari tomatoes, cherry tomatoes, grape tomatoes, roma(nita) tomatoes, bangalore tomatoes, brandywine tomotoes, etc. Apples are the fruits of the apple tree (*Malus domestica*) which is a deciduous tree in the rose family. Bell pepper is also known as Jon's Head or a pepper or *capsicum*, and is a cultivar group of the species *Capsicum annuum*.

The term "fruit" especially refers to the seed-bearing structure in flowering plants (also known as angiosperms) formed from the ovary after flowering. The term "fruit" here especially refers to those fruits that are edible. Further, the term "fruit" especially refers to fruits that have a coloring stage, either during the growth stage and/or during a ripening stage. The term "piece of fruit" refers to the single fruit. Herein, the term "fruit" may refer to the single piece of fruit or to a plurality of fruit pieces. An apple is a piece of fruit; a tomato is a piece of fruit; a bell pepper is a piece of fruit, etc. The fruit is especially a fruit that naturally contains (in the ripe state) vitamin C. Further, especially the fruit is a chlorophyll comprising (or forming) fruit. Further, especially the fruit is a fruit that has during growing and/or ripening a green stage, followed by a colored stage.

The invention is especially directed to tomatoes and bell peppers. Hence, in an embodiment the piece of fruit is selected from the group consisting of a tomato and a bell pepper. Especially for those types of fruit the invention may be used well. In more specific embodiments, the piece of fruit is a tomato. The term "plant", also called green plant, refers especially to multicellular eukaryotes of the kingdom Plantae. They form an unranked Glade Viridiplantae (Latin for green plants) that includes the flowering plants. The term "plant" includes trees.

Especially, the unripe piece of fruit comprises a tomato in the breaker stage or in a pre-breaker stage. In yet other embodiments, the tomato that is provided may be in the turning stage, in the pink stage, or even in the light red stage, especially in the turning stage or in the pink stage. In the green stage the tomato surface is completely green. The shade of green may vary from light to dark. In the breaker stage, there is a definite break of color from green to bruised fruit tannish-yellow, pink or red or 10% or less of the tomato surface. In the turning stage, tannish-yellow, pink or red color shows on over 10% but not more than 30% of the tomato surface. In the pink stage, pink or red color shows on over 30% but not more than 90% of the tomato surface. In the light red stage, pinkish-red or red color shows on over 60% but red color covers not more than 90% of the tomato surface. In the red stage, which is substantially not useful for the invention as starting material for the irradiation method, more than 90% of the tomato surface, in aggregate, is red. The red stage is especially the stage wherein the unripe fruit is turned by using the herein described method.

As indicated above, the present method is an alternative ripening method. Though in embodiments the method may be applied to fruits still attached to the fruit plant, especially the method with irradiating according to the herein describe recipi is applied to the piece of fruit detached from the plant, such in storage, or during transport, or both.

When a plurality of pieces of fruit (detached from the plant) are irradiated with the radiation according to the herein described method, the pieces of fruit are especially arranged on a support, such as in an open box, with substantially only one layer of pieces of fruit on the support. Hence, an average layer light may be about the average equivalent diameter of the pieces of fruit. The equivalent spherical diameter (or ESD) of an irregularly shaped object is the diameter of a sphere of equivalent volume. The equivalent circular diameter (or ECD) of an irregularly shaped two-dimensional shape is the diameter of a circle of equivalent area.

Hence, the invention especially comprises providing an unripe piece of fruit which is detached from a plant. As indicated above, the piece of fruit can be provided on a support, such as in an (open) box. Further, as indicated above, the piece of fruit is unripe. Under the influence of radiation, the piece of fruit (detached from the plant) will be further ripened.

The good size green tomatoes are then placed on a support, such as a tray, in a lighting unit (while being transported or stored waiting for the auction). The lighting unit will —in embodiments—operate at least about 96-192 hours, such as especially at least about 4 to 7 days to increase significantly the vitamin C. White LED can be used for this purpose at an intensity of at least about 100 µmol/m²/s, even more especially at least about 150 µmol/s/m² or higher. Light coming from the top is sufficient to increase the vitamin C in the whole tomato as product will circulate and diffuse from the skin to the flesh. The skin is where the vitamin C is highly concentrated.

Hence, the invention further includes irradiating at least part of the piece of fruit with radiation with a predetermined minimum radiation intensity and during a predetermined radiation period. The radiation may also be indicated as horticulture radiation. Note that the pieces of fruit during the herein indicated predetermined radiation period are irradiation with the herein described radiation. This implies that the piece of fruit substantially only receives this type of radiation (and substantially no daylight or other light). The herein described radiation is especially the only radiation that the piece of fruit (or at least part thereof) receives during the predetermined radiation period.

For many fruits, a partial irradiation of the piece of fruit will nevertheless ripen the entire fruit. However, in specific embodiments the method may also include rearranging at least one time during the radiation period the piece of fruit to have another part of the piece of fruit exposed to the radiation. In yet further specific embodiments, the method may include rearranging a plurality of times during the radiation period the piece of fruit to promote homogeneous irradiation of the piece of fruit. Especially, the piece of fruit (and the light source) is (are) arranged such that at least 10% of the outer part of the piece of fruit, more especially at least 20%, receives the radiation as defined herein.

The composition of the radiation, the time of the radiation and the minimum intensity of the radiation, are (relevant) parameters to provide optimum results in terms of ripening and in terms of enhancing specific compounds, such as especially vitamin C.

In a specific embodiment, at least 90% of the total number of photons of the radiation are in the range of 380-800 nm. Hence, at least 90% of the total number of photons are substantially in the visible range (which is 380-780 nm). Hence, 10% or less may in other wavelength ranges, such as UV and/or infra red. However, in yet further specific embodiments, less 10% of the total number of photons of the radiation are in the range of 700-800 nm. It appears that a low far-red content (far red is defined as 700-800 nm) is beneficial for ripening, especially for ripening with increasing vitamin C content. Hence, in specific embodiments the contribution of photons over of wavelengths of at least 700 nm (to the total number of photons) is 10% or less, especially 5% or less, such as 2% or less.

Yet further, it appears beneficial when the radiation includes a white light component. Hence, the radiation may be white light or may comprise white light enriched with one or more colors. Therefore, in specific embodiments at least 10% of the total number of photons together provide a white light component of the radiation. For instance, a light source may be used that provides white light (white light component) and that provides (optionally) additionally blue light (colored light component). The total number of photons of the white light and the total number of photons of the blue light (thus except the blue from the white light) may e.g. be available in a ratio of 10:90 (10% white light) to 100:0 (only white light). As known in the art, white light may be generated using blue, and green and red, or blue and yellow and optionally red. Also other combinations of colors may be possible to generate white light.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

In specific embodiments, (as indicated above) at least 90% of the total number of photons of the radiation are in the range of 380-700 nm, and especially at least 20% of the total number of photons together provide a white light component of the radiation. Hence, 20-100% of the photons together provide white light and when less than 100% of the photons provide together white light, white light enriched with a color is provided. In yet further specific embodiments, less 5% of the total number of photons of the radiation is in the range below 380 nm. A small amount of UV contribution may be fine, but especially the UV contribution is low, such as lower than 5% of the total number of photons. Especially, at light intensities over 200 μmol/m²/s, the UV contribution is equal to or below 5%, such as equal to or below 2%.

In embodiments, wherein white light is enriched with a color, the radiation may be white light enriched with light having one or more colors selected from the group blue, green, yellow, orange, and red. The radiation may also be white light enriched with two or more colors. Especially, white light is not enriched with deep red light.

Further, in specific embodiments in average over the predetermined radiation period the predetermined intensity is at least 100 μmol/m²/s for the piece of fruit. This radiation intensity refers to the herein defined radiation. The composition of the radiation may change with time or may be constantly the same. However, the minimum intensity provided to the piece of fruit is in average at least said 100 μmol/m²/s. Here, the term "in average" is applied, as there may be dark periods and/or as there may be periods wherein the irradiation is temporarily interrupted, such as e.g. when loading the fruit in a mobile transport device. During the time that the piece of fruit is irradiated, the intensity of the radiation may vary, but especially not below about 50 μmol/m²/s, and especially also not above about 750 μmol/m²/s, such as in embodiments not above about 650 μmol/m²/s, more specifically not above about 600 μmol/m²/s, such as in embodiments not above about 500 μmol/m²/s. Hence, solar light, even when UV, deep red and IR are removed may (under circumstances0 be too intense. As indicated herein, composition and intensity may be varied over the predetermined time but may also be substantially constant, respectively.

In specific embodiments, the predetermined radiation period is at least 48 hours. Even more especially, the predetermine radiation period is selected from the range of 48-240 hours, such as 96-216 hours. This radiation may be constantly be provided, or there may be some periods wherein there is no radiation or radiation not complying with the above composition and/or minimum intensity. Here, the predtermined time is given for the radiation provided with the indicated minimum intensity and with the indicated compositions. In principle, two periods of three days of 24 hours irradiation with at least 100 μmol/m²/s, interrupted with a day with lower or no irradation (such as e.g. in some instances during transport), may provide the predetermined radiation period at the predetermined radiation intensity.

Especially, the radiation is full-time, i.e. 24 hours a day. Hence, this means that over at least two days, such as at least 4 days, like up to 10 days, such as at maximum 9 days the piece of fruit may be irradiated with the herein described radiation full time, and especially with the minimum intensity of 100 μmol/m²/s. Here, the area indicates the area of the piece of fruit that receives the radiation. In average, the irradiated area should receive this 100 μmol/m²/s. As indicated above, it may not (always) be necessary to irradiate the entire outer face or skin of the piece of fruit. It may be enoug to irradiate part of it. Further, as indicated above, during the time that the (part of the) piece of fruit is irradiated, the intensity of the radiation may vary, but especially not below about 50 μmol/m²/s and especially also not above about 750 μmol/m²/s. Hence, two periods of three days of 24 hours irradiation with at least 50 μmol/m²/s and 150 μmol/m²/s interrupted with a day with lower or no irrdation (such as e.g. in some instances during transport), might provide the predetermined radiation period at the predetermined radiation intensity. However, especially during the entire irradiation time (here 6 days, at least 100 μmol/m²/s is provided to the part of the piece of fruit).

In specific embodiments, in average over the predetermined radiation period the predetermined intensity is in the range of 150-350 μmol/m²/s for the piece of fruit. Smaller intensities may not always lead to the desire result whereas higher intensities may lead to fruits that have less vitamine C than within the indicated intensity range. Further, especially the predetermined radiation period is in the range of 96-240 hours, such as about 96-216 hours, with at least 80% of the time irradiation (under the herein described radation conditions). It appears that best results are obtained with substantially non-stop irradiation. When e.g. said radiation is provided in a period more than about 1.2 times larger than the accumulated time wherein the herein described conditions are met (such as about two times three days irradiation with a day no irradiation), the results may be less, e.g. less vitamine C may be produced then under more constant irradiation.

The method of the invention at least comprises irradiating the unripe fruit with radation as defined herein. However, the method may also include the plucking of the fruit itself. Hence, in specific embodiments the method further comprises detaching the unripe piece of fruit from its plant to provide said unripe piece of fruit detached from a plant. In some embodiments, the fruit may be a cluster fruit. As indicated above, in yet specific embodiments, the unripe piece of fruit may be provided detached from a cluster.

Amongst others, the invention may in aspects provide a method for improving the vitamin C content of tomato fruits, comprising the steps of:

harvesting the tomato fruits when the tomato fruit has reached a mature size and the the coloration of the tomato fruit is green (or at least not in the red stage, and in embodiments also not in yet light red stage), and subsequently irradiating the tomato fruits with light having an intensity above about 150 $\mu mol \cdot m^{-2} \cdot s^{-1}$ for at least about 96 hours, such as at least 4 days.

As indicated above, the method may also comprise irradiating said at least part of the piece of fruit in a storage facility and/or comprising irradiating said at least part of the piece of fruit in a mobile transport device. For instance, part of the predetermined radation period may be in a storage facility and part of the predetermined radation period may be in a mobile transport device. The mobile transport device may especially include a trailer or container, or any other device that can be used to arrange pieces of fruit, especially on supports, such as in open boxes, in open crates, on trays, etc. etc., in. In this way, time may be used efficiently and ripening can e.g. be done during transport with a truck or a train, a ship, etc.

In yet a further aspect, the invention provides a device for ripening a piece of fruit, the device comprising a light source configured to generate radiation with at least 90% of the total number of photons of the radiation in the range of 380-800 nm, wherein less 10% of the total number of photons of the radiation are in the range of 700-800 nm, and wherein at least 10% of the total number of photons together provide a white light component of the radiation. Such device can be used in the herein described method. Such device may be used to irradiate the pieces of fruit. The pieces of fruit will in general be arranged at a distance of at least about 0.1 m, and in general at maximum about 3 m. Hence, the device is configured to generate said radiation with a predetermined intensity of at least 100 µmol/m²/s at a distance (L) from said light source, wherein said distance is especially selected from the range of 0.1-3 m, such as from the range of 0.1-1 m. A support element may be arranged within this distance, for supporting one or more pieces of fruit, such as a tray, a box, etc..

In yet further embodiments, the device may comprise a rack configured to host a plurality of support elements over each other, wherein each support element are configured to support one or more pieces of fruit, and wherein the device comprises a plurality of said light sources dedicated to the plurality of support elements, respectively. A storage of mobile transport device may include a plurality of such racks. During use, the support elements will substantially be horizontal. Hence, a light source is especially configured to irradiate in a direction of a support, such that fruit on the support is irradiated with the radation.

Hence, in yet further aspects the invention also provides a storage facility comprising the device as defined herein. Such storage device may thus be used to execute the herein described method. The storage facility may be an immobile storage facility, like a shed, a barn, an indoor market comprising a storage, an auction (site) comprising a storage, etc.. However, the storage facility may also be transportable, like a container. In yet further aspect, the invention also provides a mobile transport device comprising the device as defined herein. Such mobile transport device may thus be used to execute the herein described method. Such mobile transport device may include a trailer, a truck, etc.. Storage and/or transport may be with the fruit at ambient temperature or e.g. cooled.

In yet a further aspect, the invention also provides a piece of fruit that has an enriched vitamin C content, which content may be higher than of the same species ripened under natural conditions. Hence, in aspects the invention provides a piece of fruit having a vitamin C content of at least 30 mg/100 g, such as even more especially at least 35 mg/100 gram, yet even more especially at least 40 mg/100 g, wherein the piece of fruit especially is a tomato. The vitamin C is especially found in the pericarp. All vitamin C weights or weights of other natural compounds are herein indicated as fresh weights (FW) of the fruits.

Hence, in yet further aspects the invention also provides the use of radiation for irradiating unripe piece of fruit, especially detached from a plant, with a predetermined minimum radiation intensity and during a predetermined radiation period;
wherein
especially at least 90% of the total number of photons of the radiation are in the range of 380-800 nm, wherein especially less 10% of the total number of photons of the radiation are in the range of 700-800 nm, and wherein especially at least 10% of the total number of photons together provide a white light component of the radiation;
wherein in average over the predetermined radiation period the predetermined intensity is especially at least 100 µmol/m²/s for the piece of fruit, and wherein the predetermined radiation period is especially at least 48 hours.

Further specific embodiments of the use of this radation are also described above.

BRIEF DESCRIPTION OF THE DRAWINGS

The discloses post-harvest treatment is described in more detail and by way of non-limiting examples with reference to the accompanying drawings, wherein.

Figure 1:
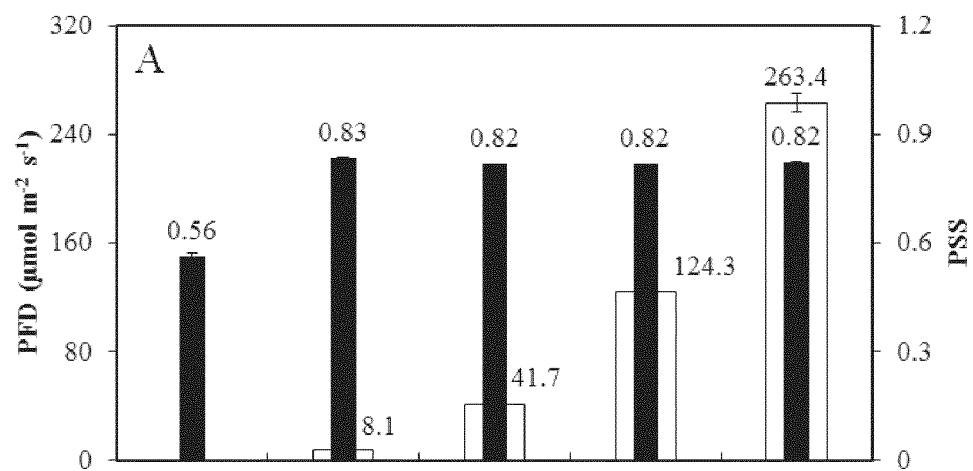
FIG. 1 shows photon flux density (PFD) and phytochrome stationary state (PSS) of the irradiance treatments (A). Spectrum of the irradiance treatments (B) (i.e. blue plus yellow (which provide a white light component; here white light). Error bars represent a SEM (standard error of the mean), n=20.

The schematic drawings are not necessarily on scale.

DETAILED DESCRIPTION OF THE EMBODIMENTS

A specific experiment to support the disclosed method for increasing vitamin C concentration (also referred to in this disclosure as AsA levels) in tomatoes is illustrated below.

Materials and Methods

Tomato fruit (*Solanum lycopersicum* cv. Komet) of three developmental stages (green, breaker and red) were harvested in December 2014 from a glasshouse in Bleiswijk, the Netherlands (52.0100° N, 4.5400° E). Fruits were selected according to colour indices, size and weight (NAI −0.6 to −0.5, NDVI −0.1 to −0.2, diameter 7 to 8 cm, weight 145 to 150 g and acoustic firmness 7 to 8). They were placed in environment controlled cabinets with constant temperature (18° C.), relative humidity (75%) and $CO_2$ concentration (360 ppm). Relative humidity and $CO_2$ concentration were measured using LI-1400 and LI-6400 respectively (Li-Cor Inc., Lincoln, Nebr., USA). The calyx was removed. In order to minimize water loss, fruit were placed with the calyx scar downwards. Five irradiance treatments were established with blue phosphorous coated LED lights (GreenPower LED research module, Philips, The Netherlands).

Light was continuously supplied. The inner sides of the climate cabinets were covered with white neutrally reflective material, enhancing uniformity of light distribution. Irradiance measurements were conducted using a spectroradiometer (USB2000, Ocean Optics, Duiven, The Netherlands; calibrated against a standard light source). Phytochrome stationary state (PSS) was calculated according to equation 1 ($N_\lambda$: photon flux at λ nm, $\sigma_{r\lambda}$: photochemical cross-section of red absorbing phytochrome state, $\sigma_{fr\lambda}$: photochemical cross-section of far-red absorbing phytochrome state) Fresh weight measurements confirmed uniform water loss for all treatments (0.62% of initial fresh weight). Temperature of the fruit was monitored with k-type thermocouples attached to the lower side of the fruit (to avoid direct shortwave radiation) on TC-08 data loggers (Picotechnology LTD., Cambridge, UK) throughout the experiment. After 0 and 13 days AsA, dehydroascorbate (DHA) and soluble carbohydrates (fructose, glucose and sucrose) were measured by high performance liquid chromatography (HPLC: ICS-5000, Dionex Corporation, Sunnyvale, Calif.). Preparation of the samples for the HPLC took place as described in Davey et al. (2003) (Davey, M., Dekempeneer, E., and Keulemans, J. (2003). Rocket-powered high-performance liquid chromatographic analysis of plant ascorbate and glutathione. Analytical biochemistry 316, 74-81.). The progress of development was monitored by measuring changes in colour (hand-held photodiode array spectroradiometer, PA1101, CP, Germany) and firmness (AFS, AWETA, Nootdorp, The Netherlands). This hand-held spectroradiometer provides the normalized anthocyanin index (NAI) calculated according to remittance spectra at 570 and 780 nm and the normalized difference vegetation index (NDVI) calculated according to remittance spectra at 660 and 780 nm (equations 2 and 3). NAI and NDVI values correspond to lycopene and chlorophyll contents respectively.

$$PSS = \left(\sum_{300}^{800} N_\lambda \sigma_{r_\lambda}\right)\left(\sum_{300}^{800} N_\lambda \sigma_{r_\lambda} + \sum_{300}^{800} N_\lambda \sigma_{fr_\lambda}\right)^{-1} \quad (1)$$

$$NAI = \frac{R780 - R570}{R780 + R570} \quad (2)$$

$$NDVI = \frac{R780 - R660}{R780 + R660} \quad (3)$$

A lower NAI implies low lycopene content and a higher NAI (thus) implies higher lycopene content; a lower NDVI implies low chlorophyll content and (thus) a higher NDVI implies higher chlorophyll content.

One-way analysis of variance (ANOVA) was used to evaluate statistically significant effects of irradiance on total AsA. Significant differences between treatments means were evaluated with post hoc Tukey's honestly significant difference multiple comparison tests (P<0.05). Statistical analyses were carried out with the R software (R 3.0.1; R Project for Statistical Computing, Vienna, Austria).

Figure 2:
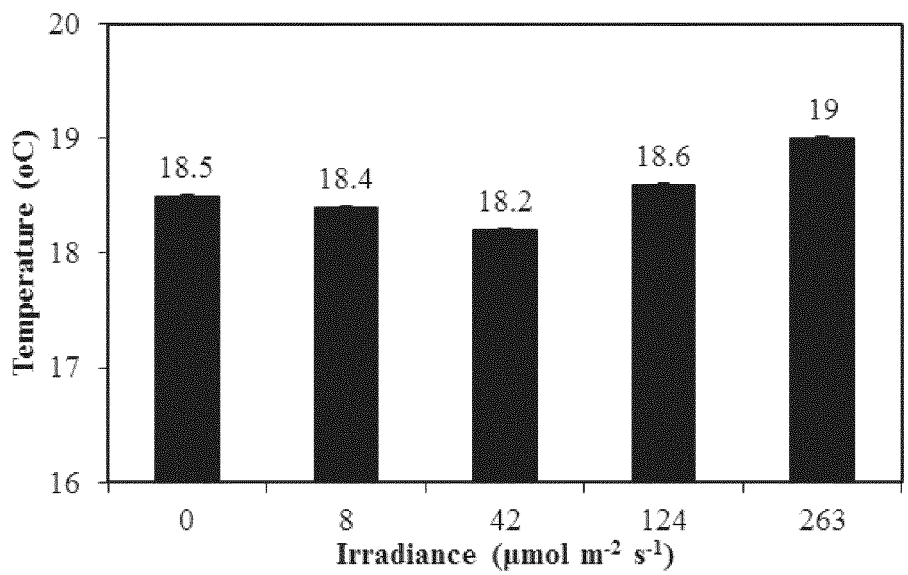
FIG. 2 shows average temperature of fruit under the irradiance treatments. Error bars represent a SEM, n=20.
Figure 3A:
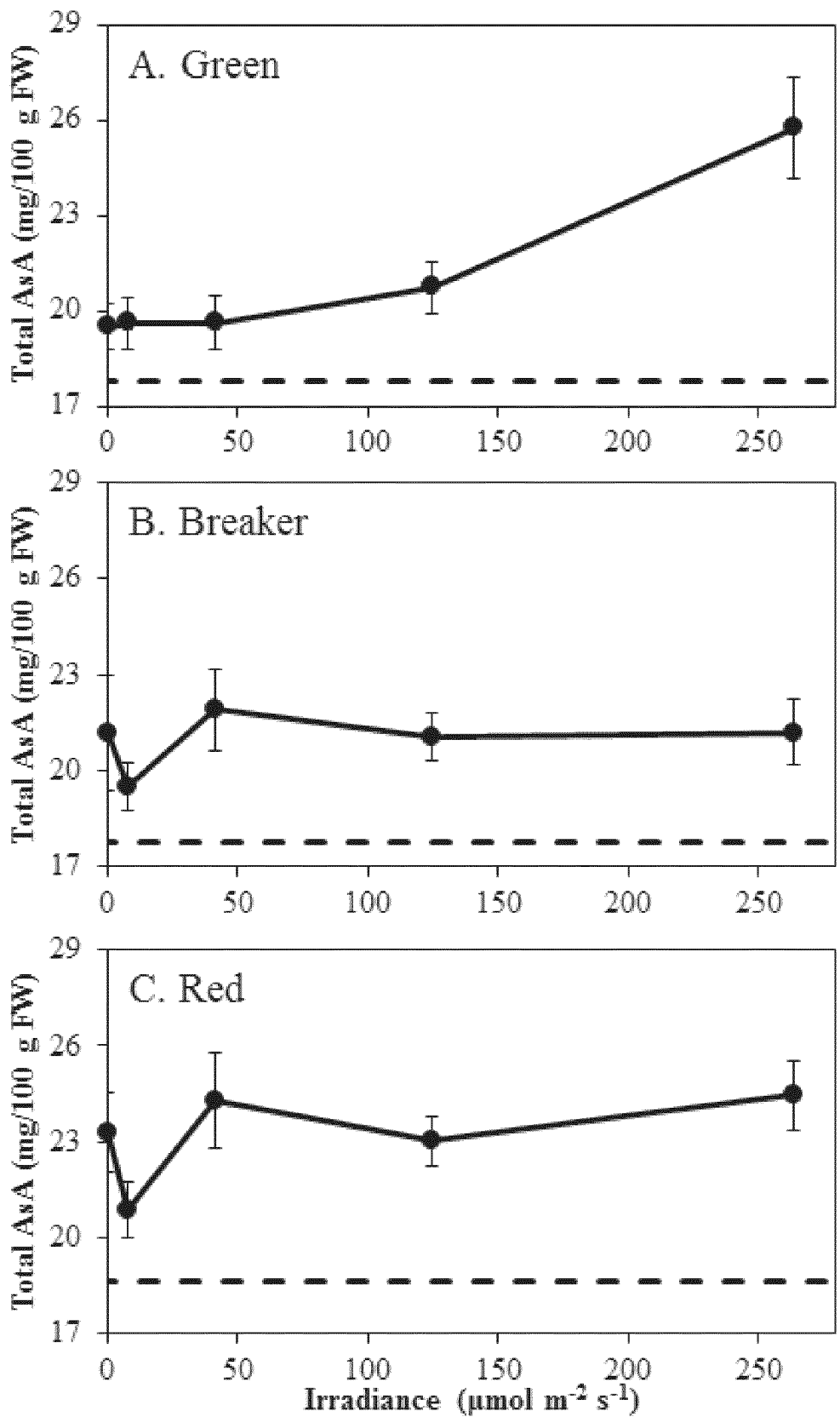
FIG. 3a shows total AsA levels of green (A), breaker (B) and red (C) of tomato fruit in the beginning of the experiment (broken line) and after 13 days in the irradiance treatments (solid line). Error bars represent a SEM, n=8. Ascorbate levels are in mg/100 g frewh weight (FW).

Treatments were established at 0 (dark), 8.1, 41.7, 124.4 and 263.4 µmol $m^{-2}$ $s^{-1}$ with the same spectral quality (FIG. 1). All irradiance treatments had the same phytochrome stationary state (PSS; Sager et al., 1988; (Sager, J., Smith, W., Edwards, J., and Cyr, K. (1988). Photosynthetic efficiency and phytochrome photoequilibria determination using spectral data. Transactions of the ASABE (American Society of Agricultural and Biological Engineers), 1882-1889.)) Blue phosphorous coated LEDs provide with a wide spectrum (FIG. 2) avoiding this way lack of possibly essential wavelengths for AsA regulation. The inner sides of the climate cabinet were covered with white neutrally reflective material, enhancing uniformity of light distribution. Irradiance measurements were conducted by spectrometer (USB2000, Ocean Optics, Duiven, The Netherlands; calibrated against a standard light source). Fresh weight measurements ensured uniform water loss for all treatments. Temperature of the fruit was monitored with k-type thermocouples on TC-08 data loggers (Picotechnology LTD., Cambridge, UK) throughout the experiment. Maximum temperature differences between treatments were less than 1° C. (FIG. 3a). AsA, dehydroascorbate (DHA) and soluble carbohydrates (fructose, glucose and sucrose) were measured in high performance liquid chromatography system (ICS-5000, Dionex Corporation, Sunnyvale, Calif.). Preparation of the samples for the HPLC took place as described in Davey etal. (2003). The progress of development was monitored through changes in colour (hand-held photodiode array spectrometer, PA1101, CP, Germany) and firmness (AFS, AWETA, Nootdorp, The Netherlands). This device provides the normalized anthocyanin index (NAI) calculated according to remittance spectra at 570 and 780 nm and the normalized difference vegetation index (NDVI) calculated according to remittance spectra at 660 and 780 nm. The duration of the treatment was 13 days.

Results and Discussion

Total AsA levels were measured after 13 days of irradiance treatments. Accumulation of AsA in tomato fruit increases when fruit are treated with higher irradiances. This increase is different for each developmental stage. Green fruit were found to be the most responsive with a significant increase of 32% in comparison to red fruit (5% not significant). Green fruit eventually achieved higher absolute levels of total AsA than red fruit. The dose-response curve of AsA to irradiance for green fruit follows an exponential trend indicating that the saturation point of AsA to irradiance is probably at higher light intensities. Comparing the lowest irradiance level (8.1 µmol m$^{-2}$ s$^{-1}$) with the darkness treatment, no significant differences were observed.

Figure 3B:
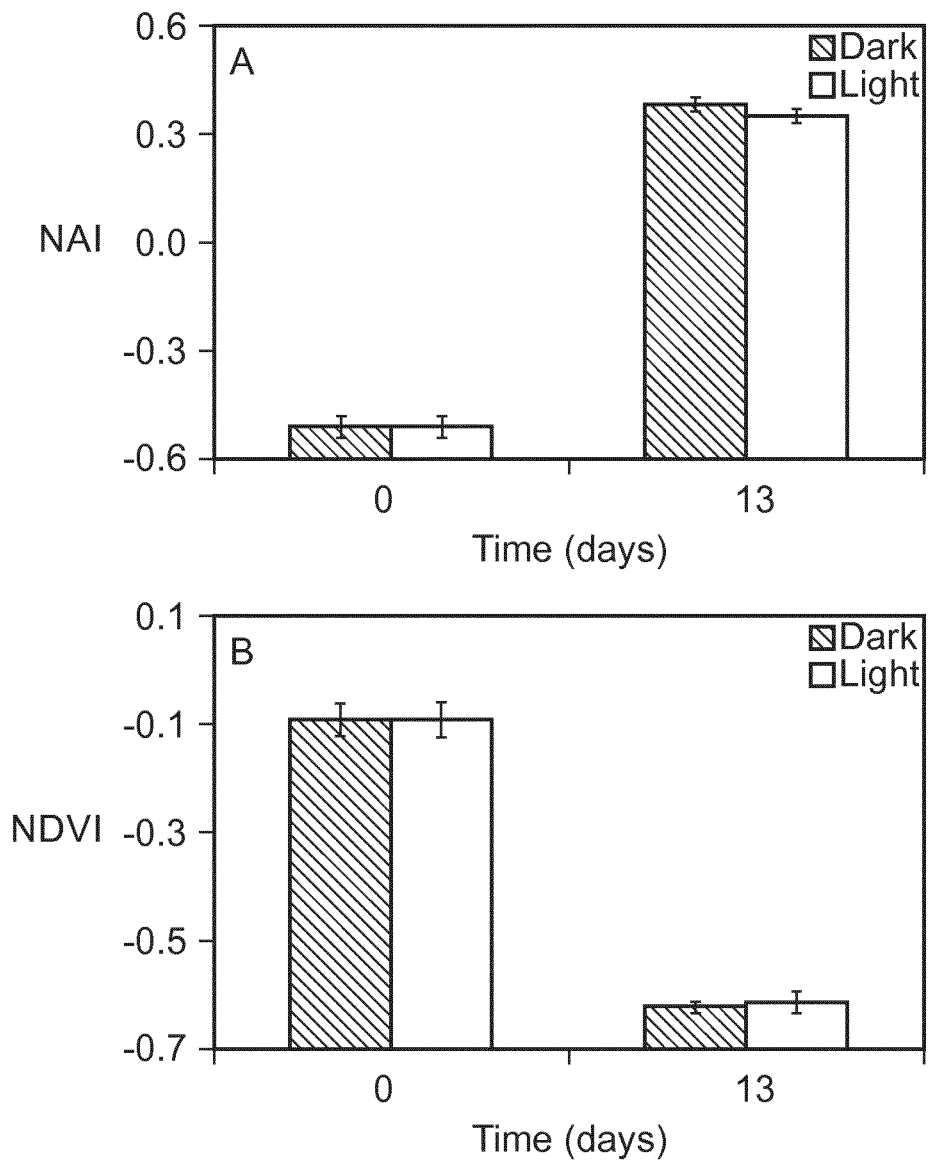
FIG. 3b shows the normalized anthocyanins (A) and normalized vegetation (B) indices (NAI and NDVI, respectively) before and after 13 days in darkness and (highest) irradiance treatment (263 µmol m$^{-2}$ s$^{-1}$). Error bars represent SEM, n=5.

At the beginning of the treatment (t=0 days) tomatoes were at the mature green stage (full sized). By the end of the treatment (t=13 days) fruit reached a red ripe stage in all light treatments as confirmed by the NAI and NDVI (dark control and the highest light treatment were the same; FIG. 3b). This indicates that light treatments did not accelerate the rate of development of the fruit in comparison to the dark treatment. The similar ripening of dark and light treated tomatoes was also reflected in similar loss of firmness as measured by acoustic firmness measurements (data not shown).

Figure 4:
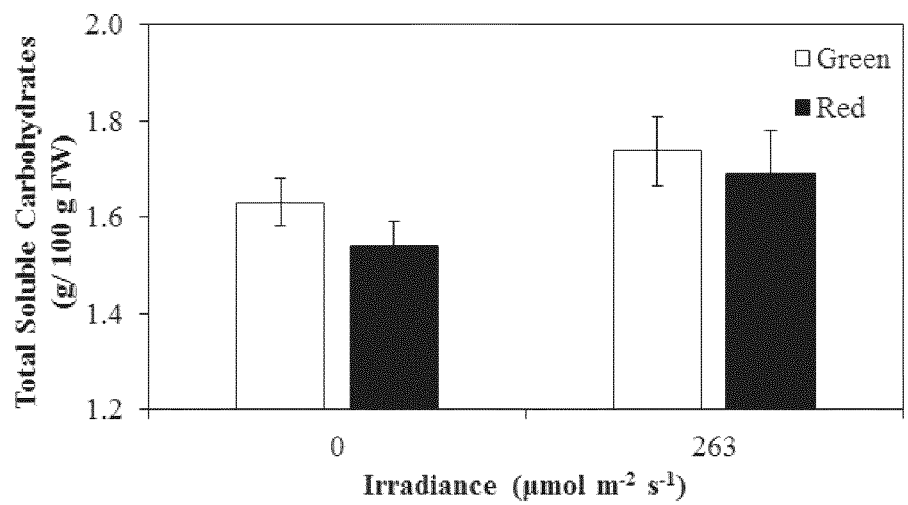
FIG. 4 shows total soluble carbohydrate content of green and red fruit at the extreme irradiance treatments. Levels achieved after 13 days in the light treatment. Error bars represent SEM, n=8.
Figure 5:
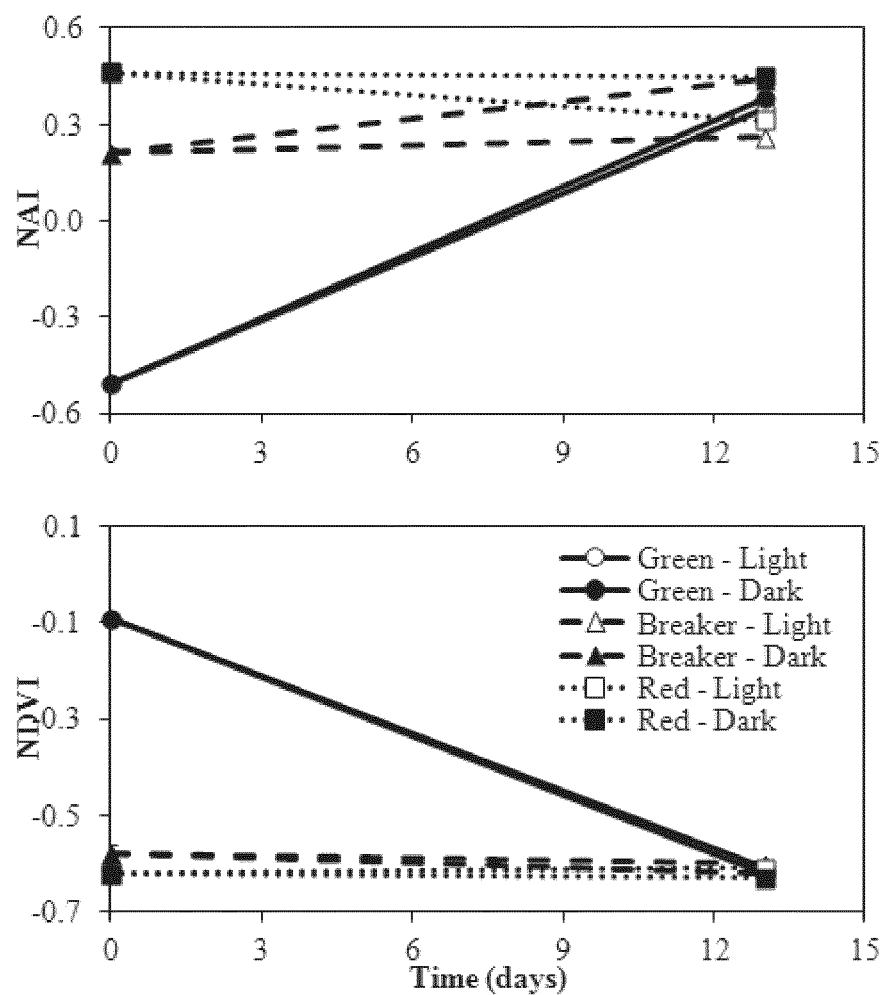
FIG. 5 shows normalized anthocyanin and normalized vegetation indices (NAI and NDVI, respectively) before and after 13 days in the light treatments. Error bars represent SEM, n=5.

Progress of development results in a slight increase in AsA content in all developmental stages. That could be attributed to increased activity of the secondary pathway due to ripening. For each developmental stage both NAI and NDVI were the same between darkness and the highest developmental treatment (FIG. 4). This indicates that light treatments did progress development of the fruit in comparison to the dark treatment. This was also confirmed by acoustic firmness measurements (data not shown).

Irradiance is the abiotic factor with the most pronounced effects on AsA found in plant tissue. These effects have been confirmed for both leaves and fruit (Massot et al., 2012). In this work we prove that tomato fruit that have been removed from the plant are still responsive to irradiance treatments by increasing their levels of AsA (FIG. 3a). This allows to (a) understand better AsA regulation off and on the plant and (b) develop a system for postharvest improvement of AsA in fruit. Optimal AsA levels are achieved at higher than 263 µmol m$^{-2}$ s$^{-1}$.

Irradiance levels that do not affect physiological processes (respiration photosynthesis; lowest irradiance treatment—8 µmol m$^{-2}$ s$^{-1}$) directly linked to AsA regulation did not result in AsA accumulation. Therefore, regulation of AsA via both gene expression signalling and physiological processes occurs after an irradiance threshold.

Total carbohydrates did not differ significantly between the extreme irradiance treatments and the extreme developmental stages (FIG. 4). This indicates that regulation of AsA by light is not done via the substrate but probably other related physiological processes (respiration and/or photosynthesis) or direct signalling of light. The extremely low absolute levels of carbohydrates observed might be a limitation for further upregulation of AsA by light.

Figure 6:
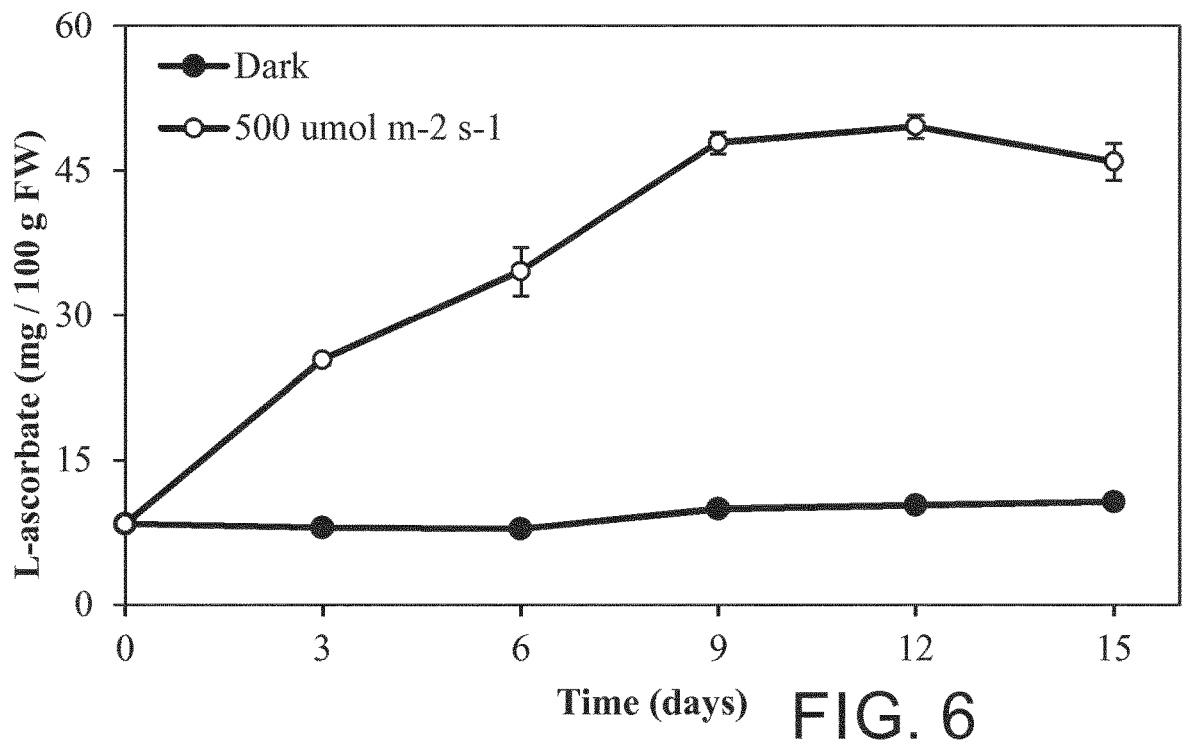
FIG. 6 shows vitamin C content as a function of time upon illumination with LED lighting versus dark environment.

FIG. 6 shows a 5 times increase of the vitamin C content as a function of time upon illumination with LED lighting. After 9 days of illumination, no further increase is observed.

Figure 7:
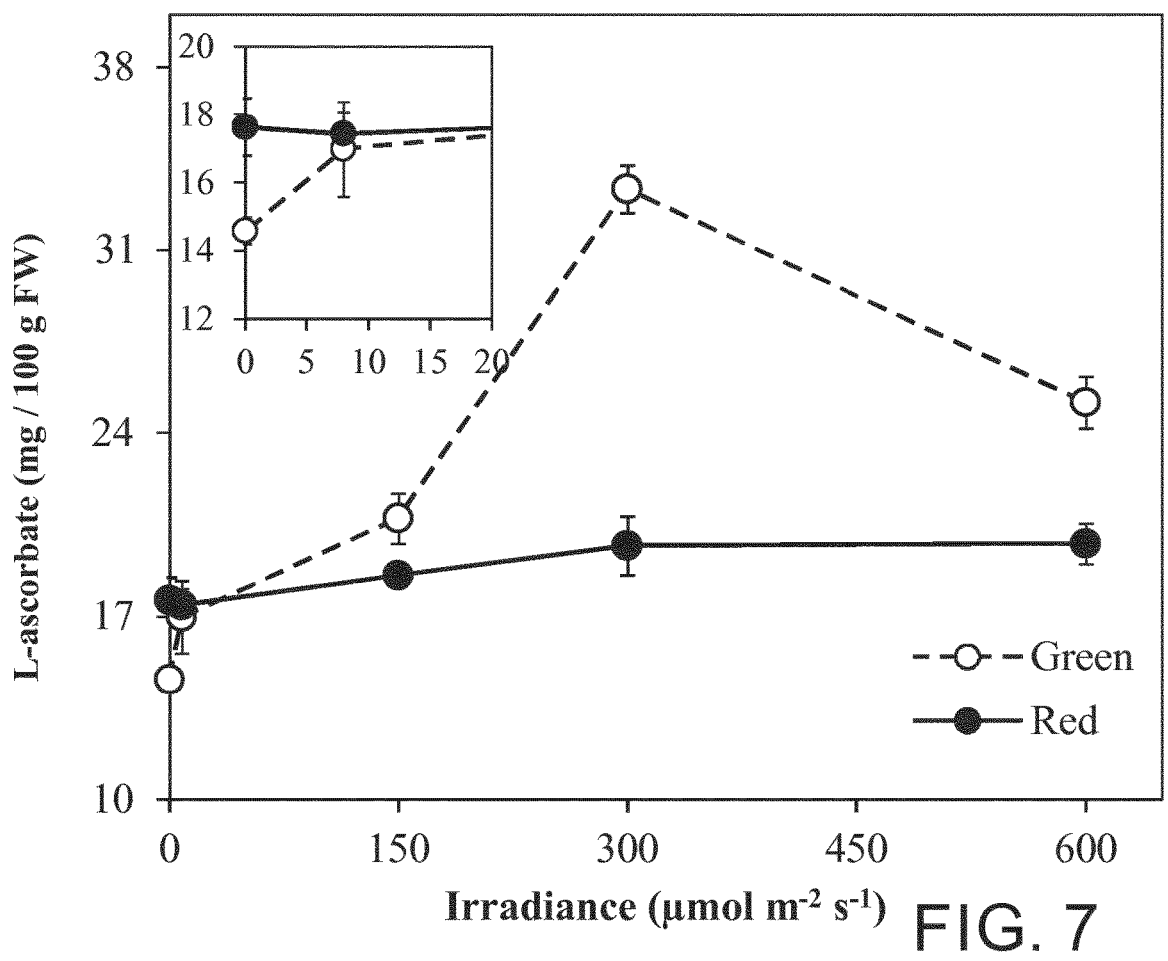
FIG. 7 shows vitamin C of green harvested tomato (green line; i.e. upper line) versus red harvested tomato (red line; i.e. lower line) as a function of total irradiance at 7 days.

FIG. 7 shows the increase in vitamin C of green harvested tomato (green line) versus red harvested tomato (red line) as a function of total irradiance at 7 days.

Figure 8:
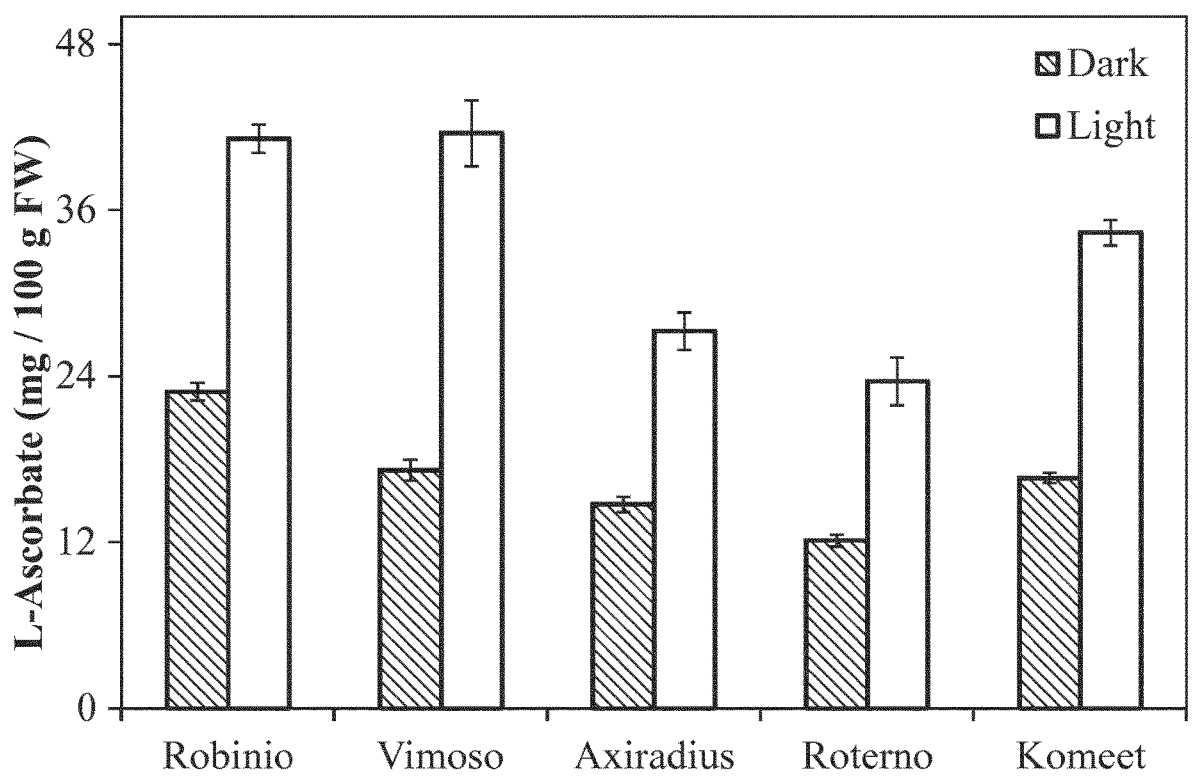
FIG. 8 shows the response of various cultivars with irradiation of 300 umol/s/m².

FIG. 8 shows the response of various cultivars with irradiation of 300 umol/s/m2. This irradiation is the most optimum for most cultivars.

Figure 9:
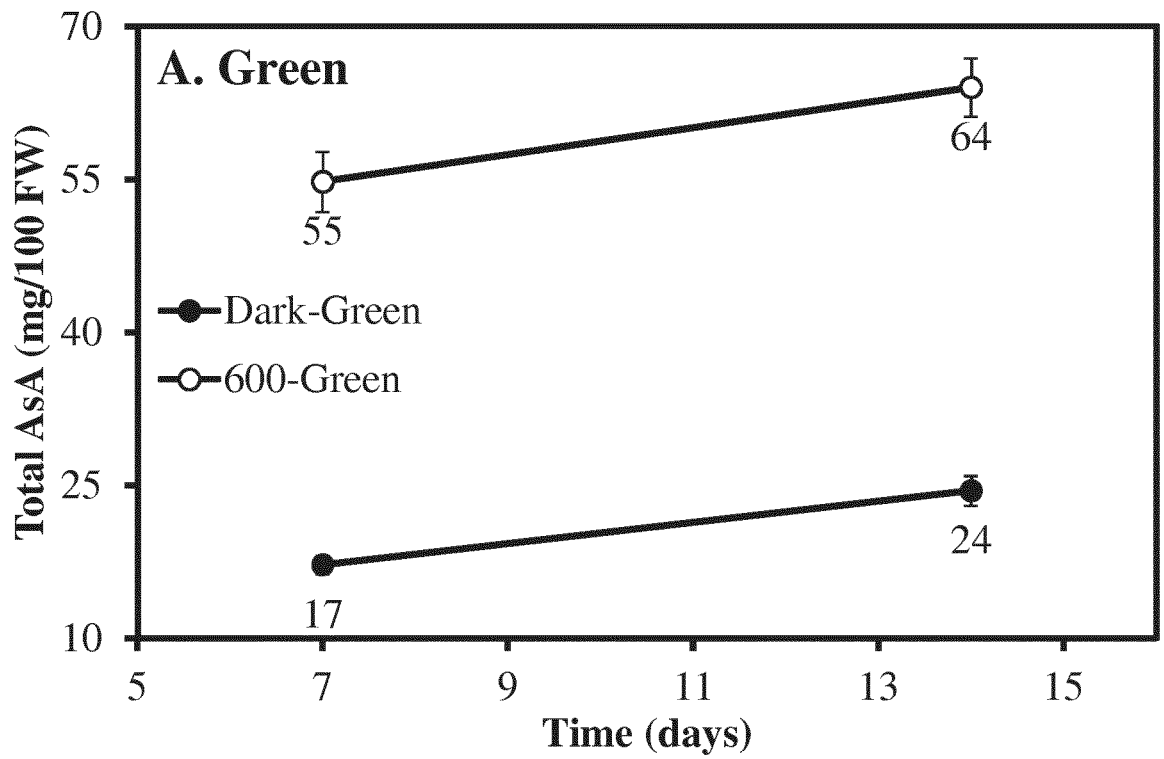
FIG. 9 shows the effect of a longer term irradiation of up to 14 days with 600 µmol·m$^{-2}$·s$^{-1}$ on green and red tomatoes.
Figure 9:
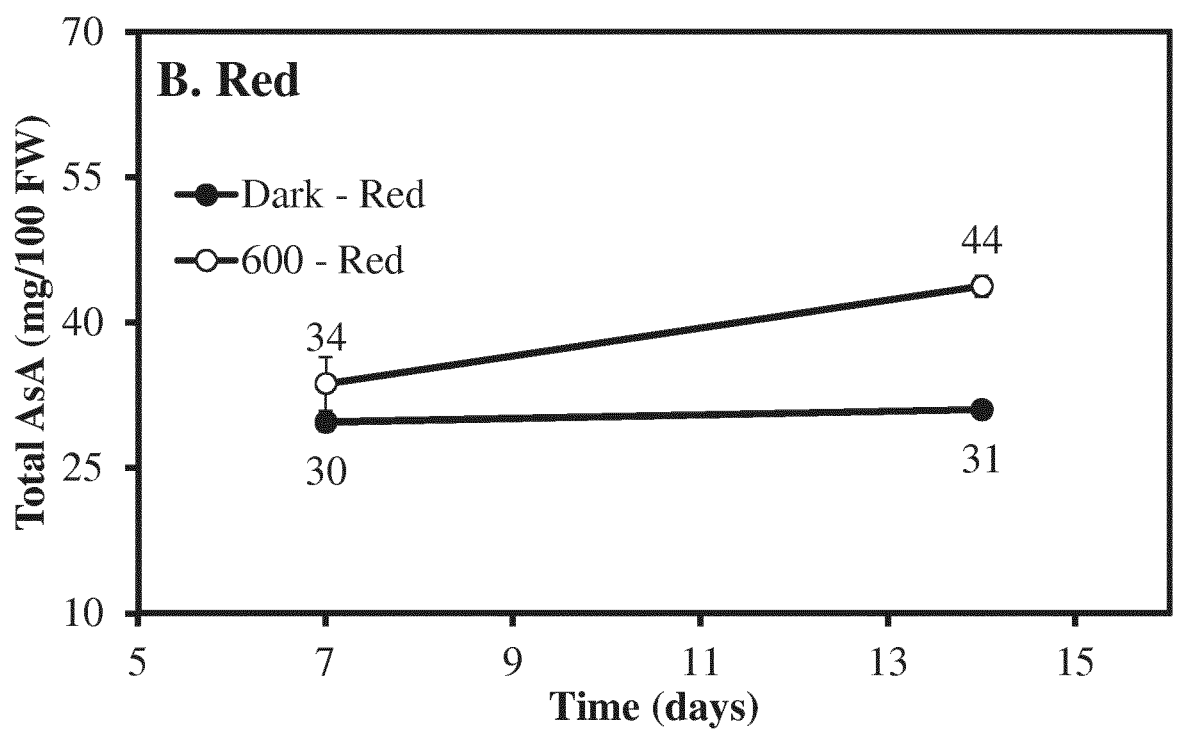

FIG. 9 shows the effect of a longer term irradiation of up to 14 days with 600 µmol·m$^{-2}$·s$^{-1}$ on green and red tomatoes. Vitamin C contents of above 50 mg/100 gram FW are observed for green harvested tomatoes.

A Commercial System for Postharvest Enhancement of AsA

Light is a key component of a potential system for the postharvest upregulation of AsA. These results consist the basis of further investigation of light effects on AsA before the design of a relevant system. The optimum irradiance level for AsA have to be specified also in respect to the duration of the treatment (Labrie and Verkerke, 2012). Light quality has also an effect on AsA levels of plant tissue. Higher R:FR results in more AsA (Bartoli et al., 2009). Spectral bands that promote related physiological processes might also be beneficial (e.g. light colours that promote photosynthesis). Tomato fruit to be treated should be selected in respected top the following criteria: (a) cultivars that are considerably responsive, (b) fruit with considerable carbohydrate content so that no substrate limitations will exist and (c) appropriate developmental stages (as shown in this experiment). Green fruit are the most responsive (this paper). Certain supply chains around the world have tomato fruit harvested green to minimize loss during transportation. Finally, storage and transportation temperature is also a critical control point as temperature also affects AsA levels in plants. LED lighting is a technology of high potential for such application. It is not only energy efficient (avoiding temperature side effects) but also allows the selective application of specific spectra. LEDs come in compact modules and allows easy installation in several parts of the production chain (e.g. rooms and trucks). Due to low heat emissions fruit can be placed very close to the LED lamps.

CONCLUSIONS

Postharvest irradiance treatments increase AsA levels of tomato fruit. Green fruit are more responsive than fruit at later developmental stages (breaker and red). Low levels of soluble carbohydrates may consist a significant limitation for upregulation of AsA by irradiance.

FURTHER EXPERIMENTS

Figure 10:
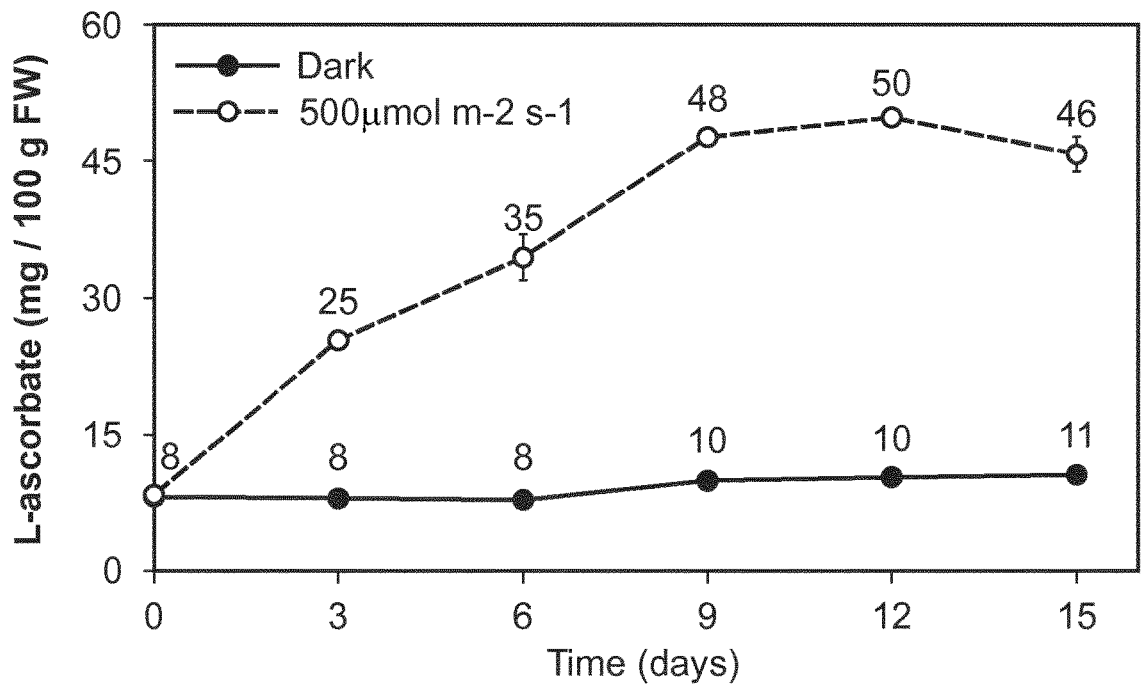
FIG. 10 shows that vitamin C levels of detached tomato fruit increase with white LED light treatment (500 umol m$^{-2}$ s$^{-1}$) until the fruit changes coloration from green to red. Only green fruit respond to the light treatments. High vitamin C levels (fresh weights) are maintained for fruit kept in light. No increase occurs for fruit lift in darkness.

Vitamin C levels of detached tomato fruit increase with white LED light treatment (500 umol m$^{-2}$ s$^{-1}$) until the fruit changes coloration from green to red. This is depected in FIG. 10. Only green fruit respond to the light treatments. High vitamin C levels are maintained for fruit kept in light. No increase occurs for fruit lift in darkness (this is depected in FIG. 10.).

Figure 11:
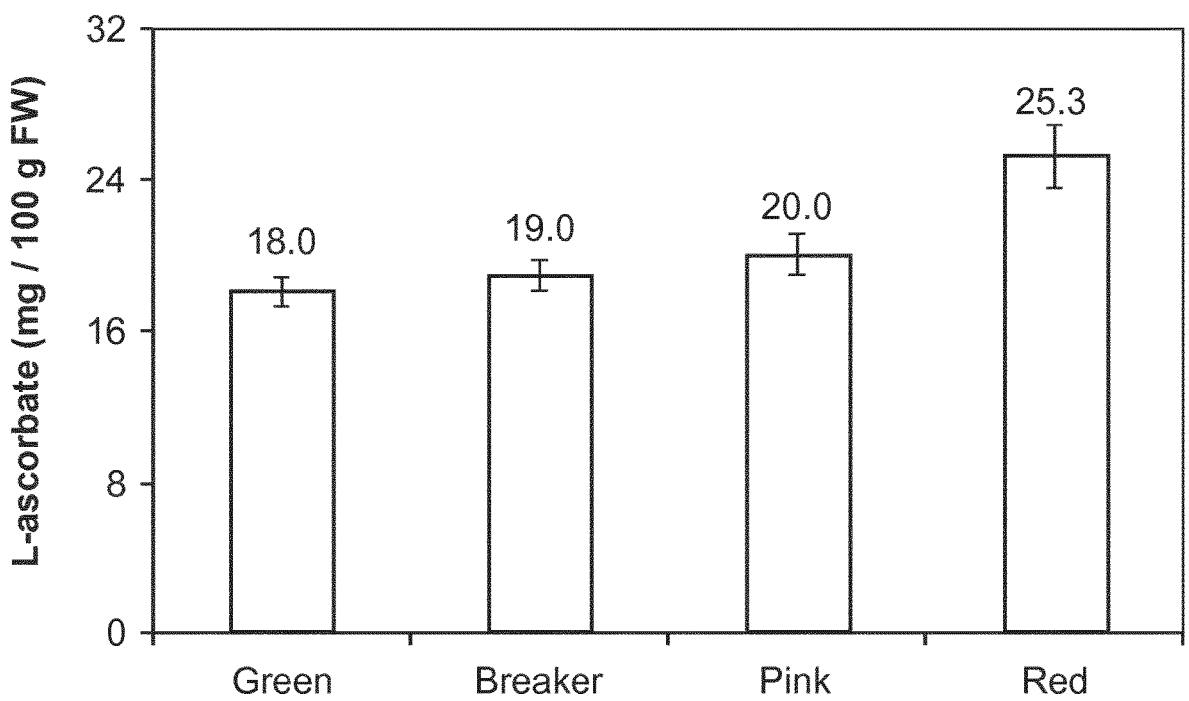
FIG. 11 shows that for fruit harvested directly from the field we do not observe any differences in vitamin C for different developmental stages (green, breaker, pink and red stage). From the last two points we can exclude vitamin C going up due to enhanced ripening stimulated by light as during ripening vitamin C levels do not change considerably. Observed upregulation is an effect of white LED lighting.

For fruit harvested directly from the field we do not observe any differences in vitamin C for different developmental stages. From the last two points we can exclude vitamin C going up due to enhanced ripening stimulated by light as during ripening vitamin C levels do not change considerably. Observed upregulation is an effect of white LED lighting. This is depicted in FIG. 11.

Figure 12:
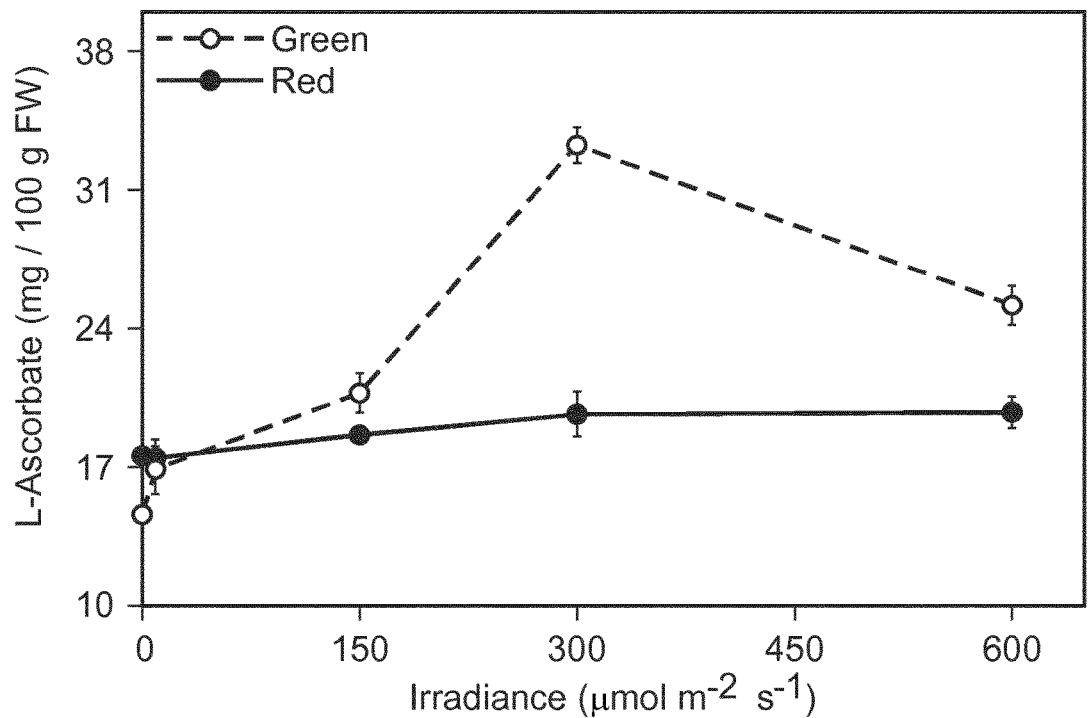
FIG. 12 shows several light intensities of white LED light which were tested for the same duration on green and red detached tomato fruit. Red fruit do not respond. Green fruit achieve higher vitamin C levels at higher light intensities with an optimum at 300 umol m$^{-2}$ s$^{-1}$ in this setup.

Several light intensities of white LED light were tested for the same duration on green and red detached tomato fruit. Red fruit do not respond. Green fruit achieve higher vitamin C levels at higher light intensities with an optimum at 300 umol m$^{-2}$ s$^{-1}$ in this setup. This is depicted in FIG. 12. In combination with the previous experiment the irradiance optimum should be defined between 200-600 m$^2$ s$^{-1}$, especially 300-500 µmol m$^{-2}$ s$^{-1}$.

Figure 13:
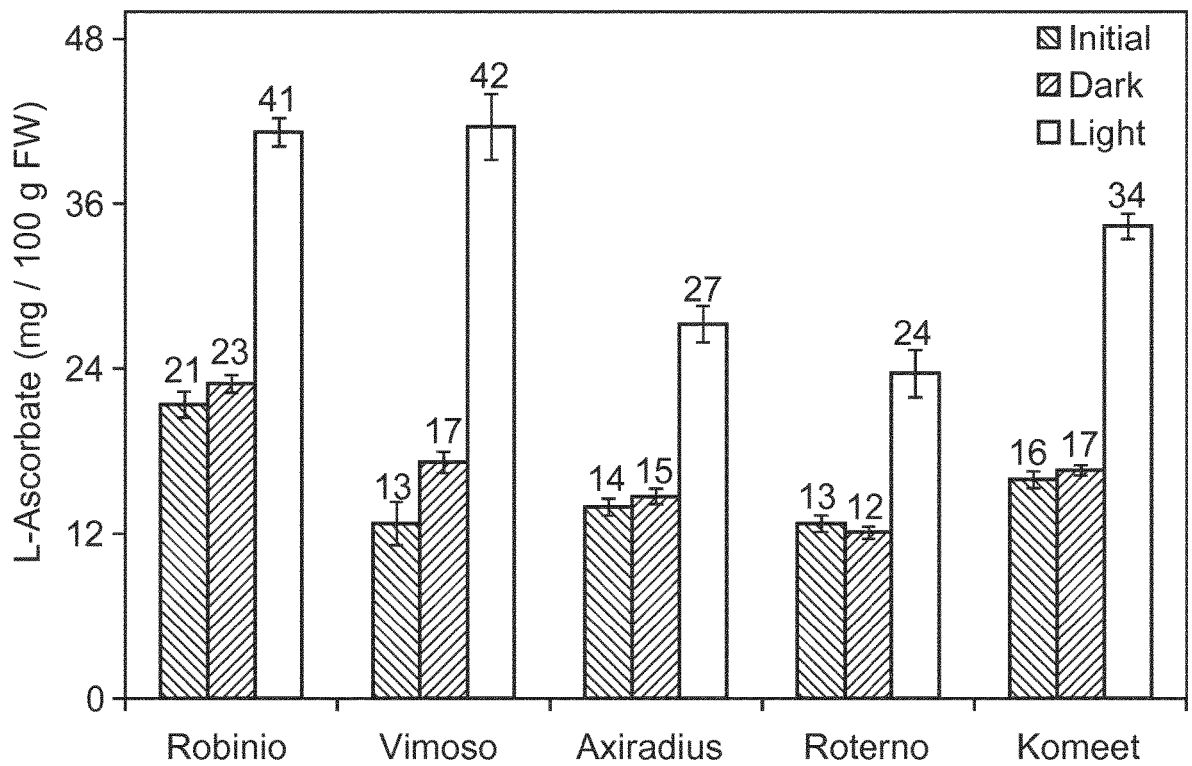
FIG. 13 shows the results on five commercial tomato cultivars that were tested. All cultivars achieve higher levels of vitamin C when detached green fruit are treated with white LED light.

Five commercial tomato cultivars were tested. All cultivars achieve higher levels of vitamin C when detached green fruit are treated with white LED light. This indicates a universal effect for tomato. There more and less responsive cultivars. This is depicted in FIG. 13. For these experiments, 300 µmol m$^{-2}$ s$^{-1}$ 24 hours each day during 7 days was applied.

Figure 14:
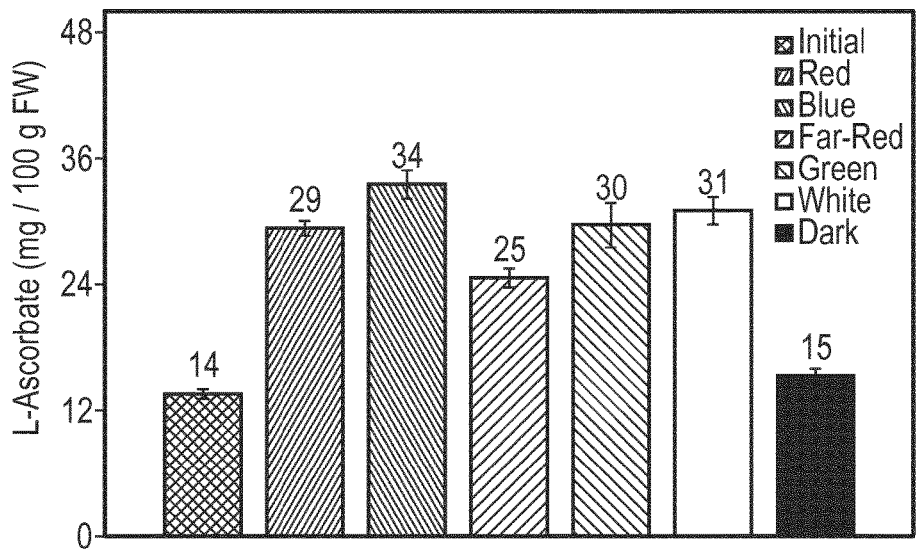
FIG. 14 shows the impact of light quality treatments on total ascorbate levels of tomato fruit. Light quality treatments were established by monochromatic LEDs at 250 µmol/m². In all treatments there was background radiation of white led supplied by LEDs at 100 µmol/m²/s.
Figure 15A:
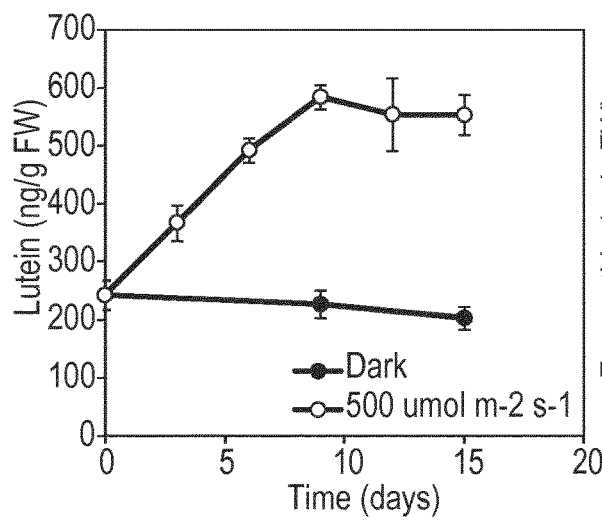
FIGS. 15a-15h show the influence of the irradiation over time on natural components in tomatoes (type antioxidants and vitamins). Note that here on the y-axis nanogram/gram FW is indicated.
Figure 15B:
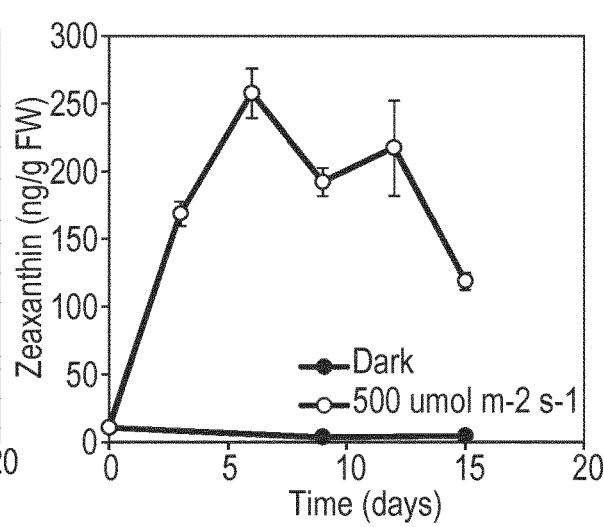
Figure 15C:
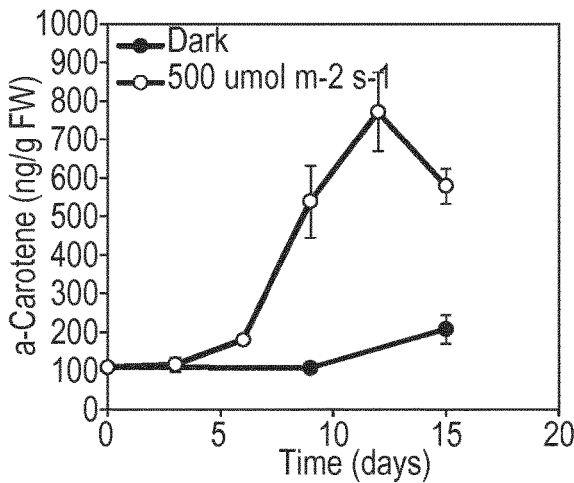
Figure 15D:
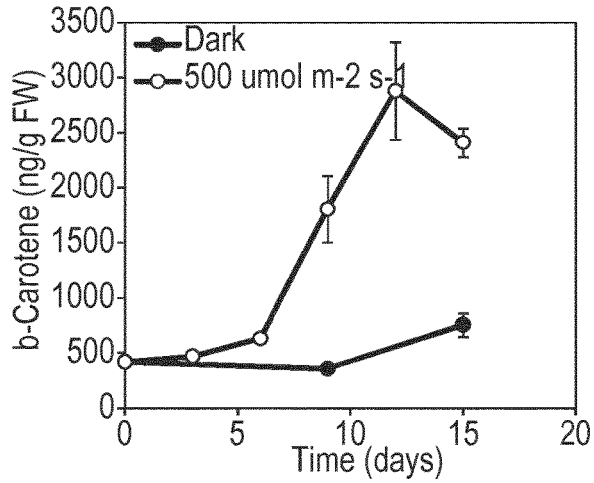
Figure 15E:
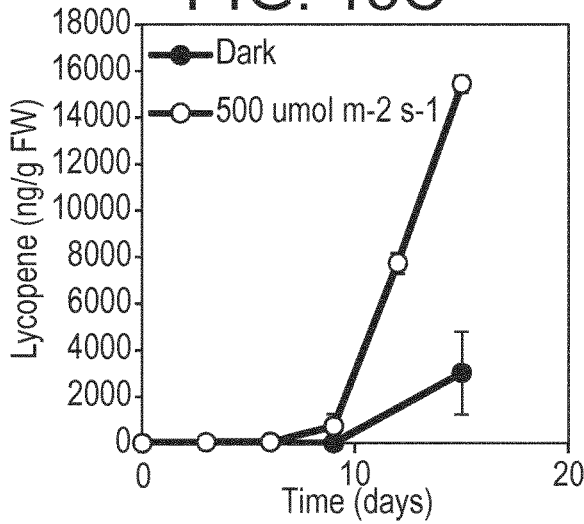
Figure 15F:
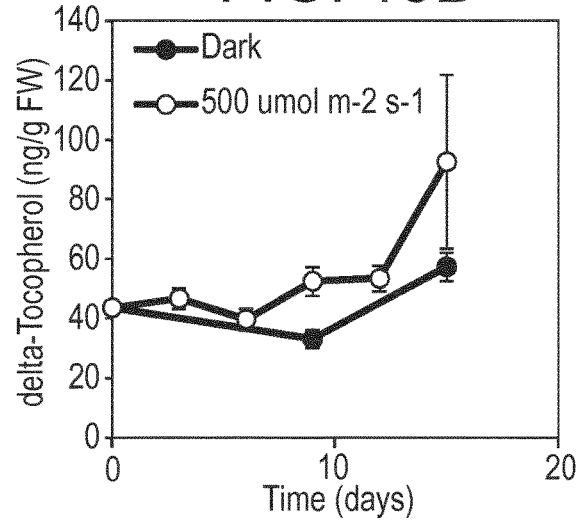
Figure 15G:
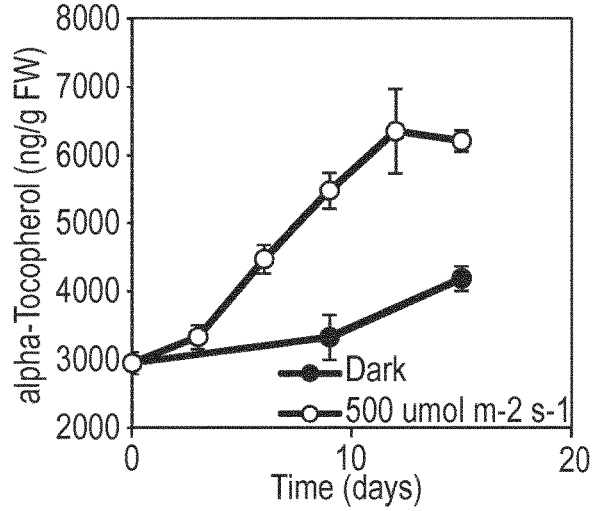
Figure 15H:
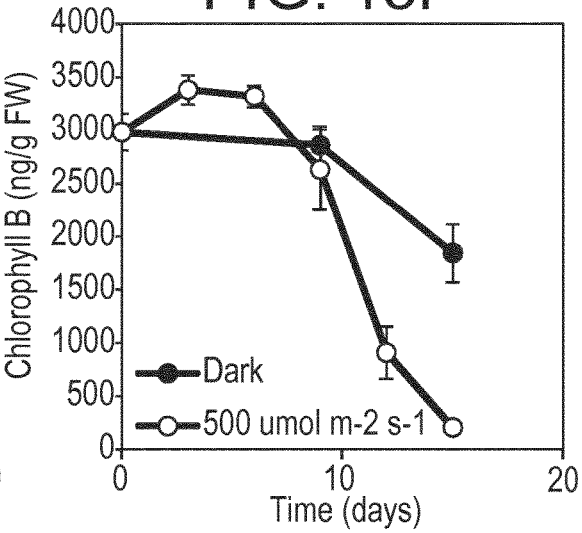

In some experiments, specific light treatment protocols were applied. These included white light (white light component), and on top thereof colored light was added (e.g. white LEDs in combination with LEDs emitting colored light)(colored light component). The options used, and the results on the generation of ascorbic acid are shown in FIG. 14. The initional ascorbic acid content and content after a dark period are the same. Further, as can be seen, the differences between the types of light are relatively small, though far read has a significantly lower impact than white light, or white light enriched with blue. The recipies used for FIG. 14 are indicated in below table (with the values of the light treatments in µmol m$^{-2}$ s$^{-1}$):

| Treatment | White | Color | Total |
|---|---|---|---|
| Dark | 0 | 0 | 0 |
| Red | 100 | 250 | 350 |
| Blue | 100 | 250 | 350 |
| Far Red | 100 | 250 | 350 |
| Green | 150 | 200 | 350 |
| White | 350 | 0 | 350 |

All light quality treatments improved vitamin C levels of detached tomato fruit. Different light colors seem to have a similar effect with blue and far-red being the extreme ones. All light colors improve vitamin C levels, while far—red is a significantly less effective. Here, the irradiation was 24 hours a day for seven days. In the examples above, about 30% of the radiation is provided by the white light component (for red, blue, far red, and green).

Other natural compounds were investigated as well. The concentrations after constant light treatment (24 h each day), with 500 µmol m$^{-2}$ s$^{-1}$ are shown in FIGS. 15a-15h. In those experiments, white light was used (without far red or UV).

Figure 16A:
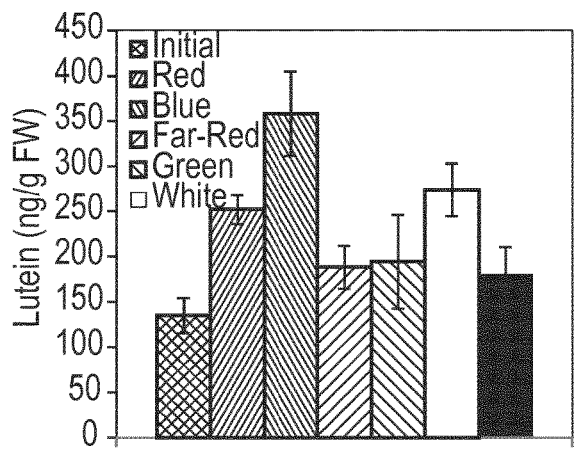
FIGS. 16a-16h show the influence of the composition of the radation on natural components in the tomatoe. Again, on the y-axis nanogram/gram FW is indicated.
Figure 16B:
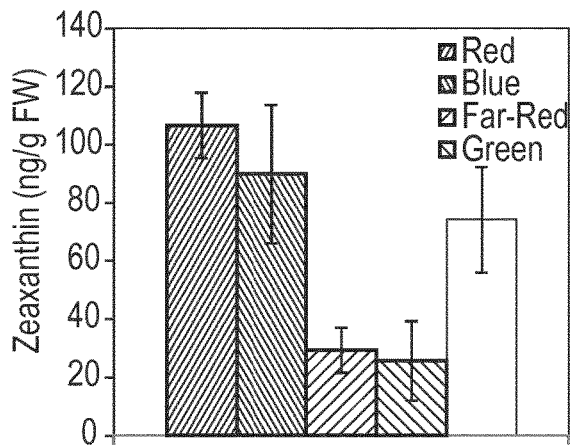
Figure 16C:
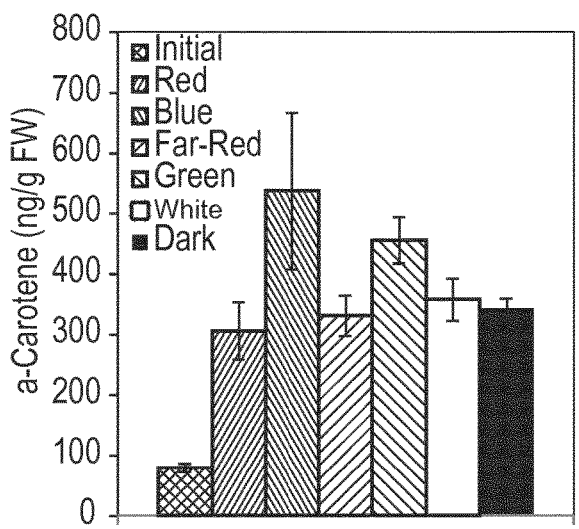
Figure 16D:
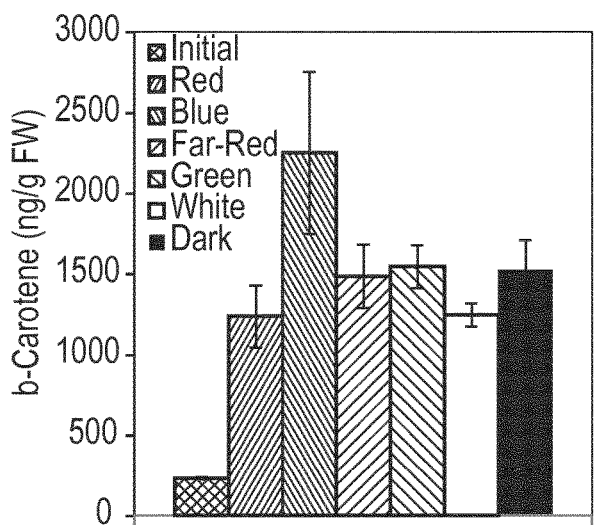
Figure 16E:
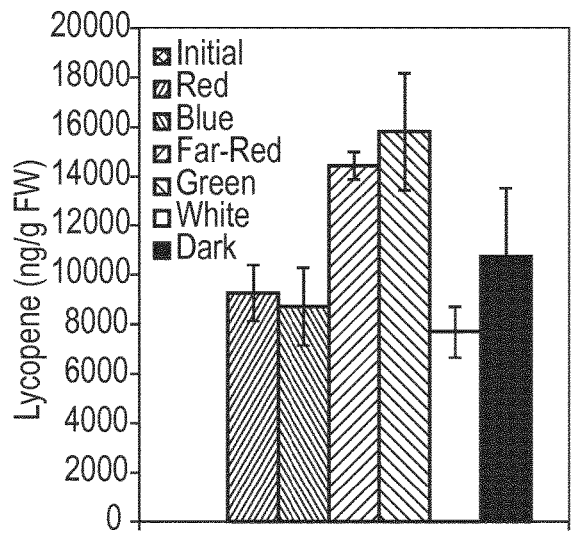
Figure 16F:
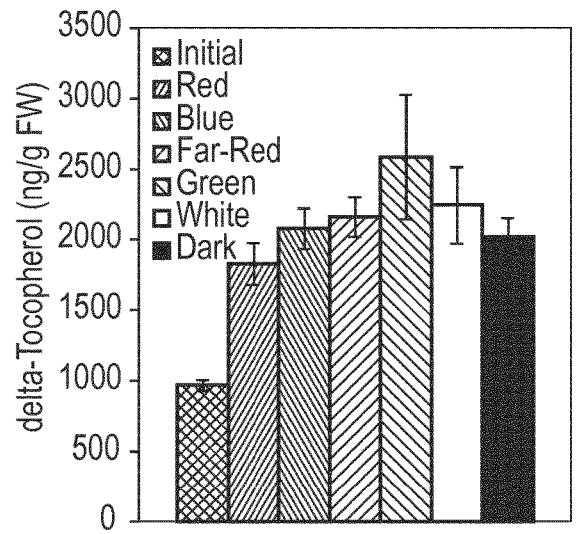
Figure 16G:
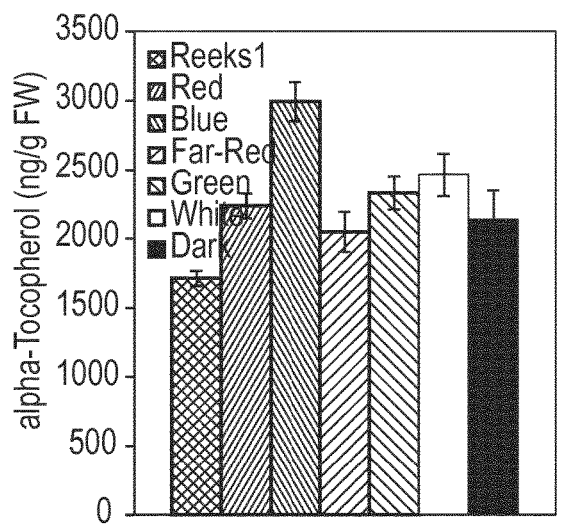
Figure 16H:
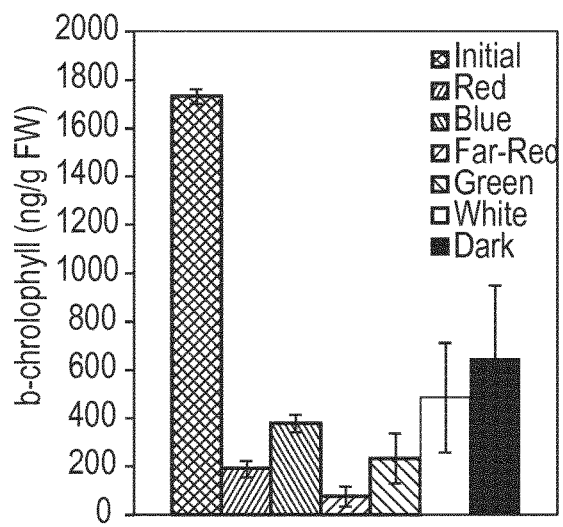

In the same experiments, other natural compounds were checked as well. The results are displayed in FIGS. 16a-16h. From these data, the following can be concluded:
  blue enriched white light (and optionally blue light only), can be used to enrich the fruit with lutein (FIG. 16a);
  red enriched white light (and optionally blue light only), can be used to enrich the fruit with zeaxanthin (FIG. 16b);
  blue and/or green enriched white light (and optionally green and/or blue light only), can be used to enrich the fruit with α-carotene (FIG. 16c);
  blue enriched white light (and optionally blue light only), can be used to enrich the fruit with (62-carotene (FIG. 16d);
  green and/or far red enriched white light (and optionally green and/or far red light only) can be used to enrich the fruit with lycopene (FIG. 16e); and
  blue enriched white light (and optionally blue light only), can be used to enrich the fruit with α-tocopherol (FIG. 16g).

Figure 17A:
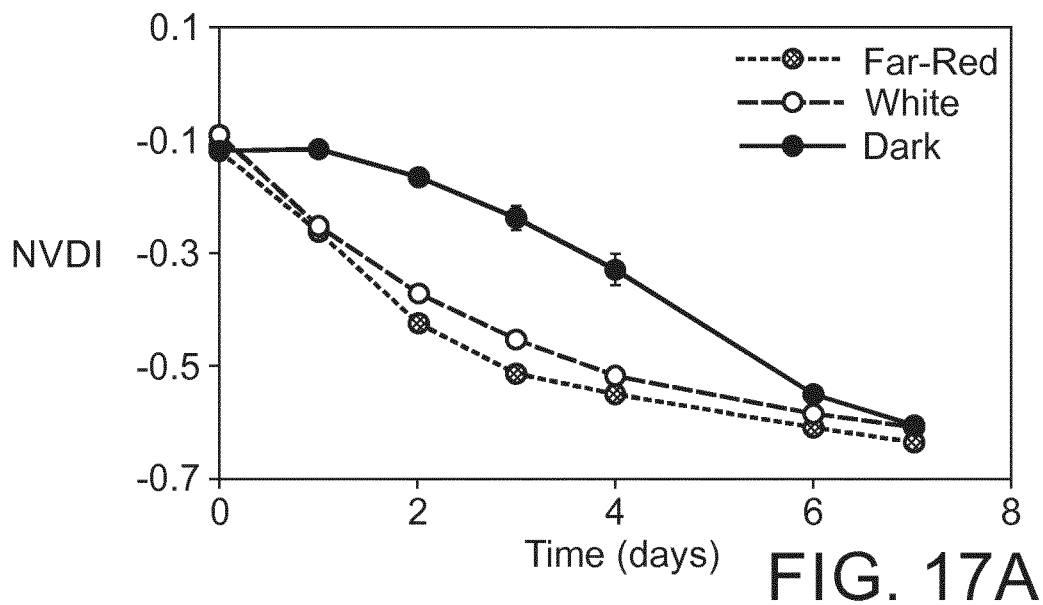
FIGS. 17a-17c show the progress of fruit development under white and far-red LED treatments and darkness. Light treatments were established by the use of monochromatic LEDs at 250 µmol/m²/s with 100 µmol/m²/s background white LED light. Developement indices relate to chlorophyll (NDVI) and lycopene (NAI) content and firmness of the fruit.
Figure 17B:
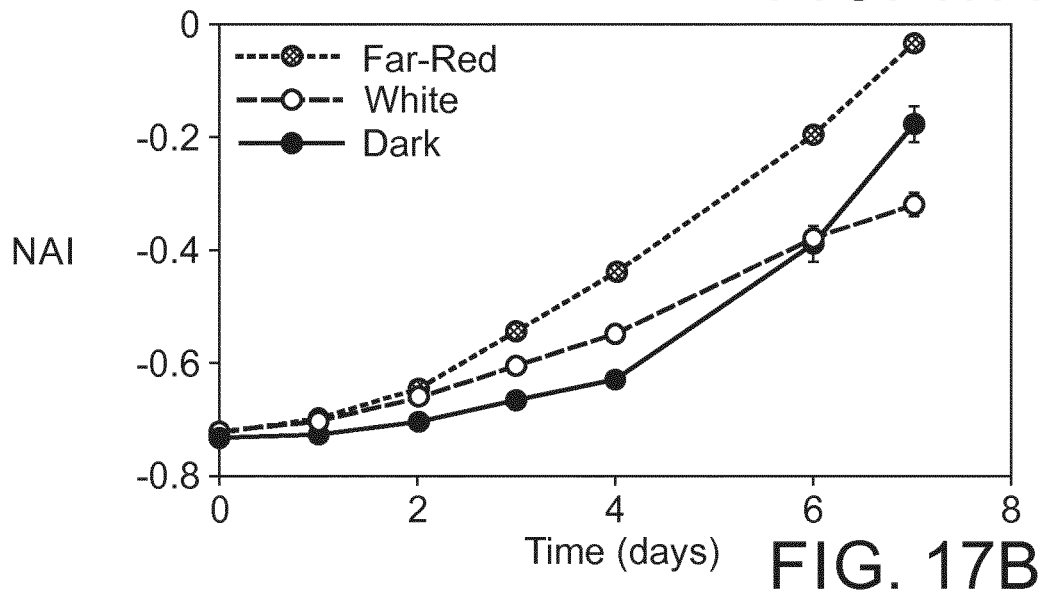
Figure 17C:
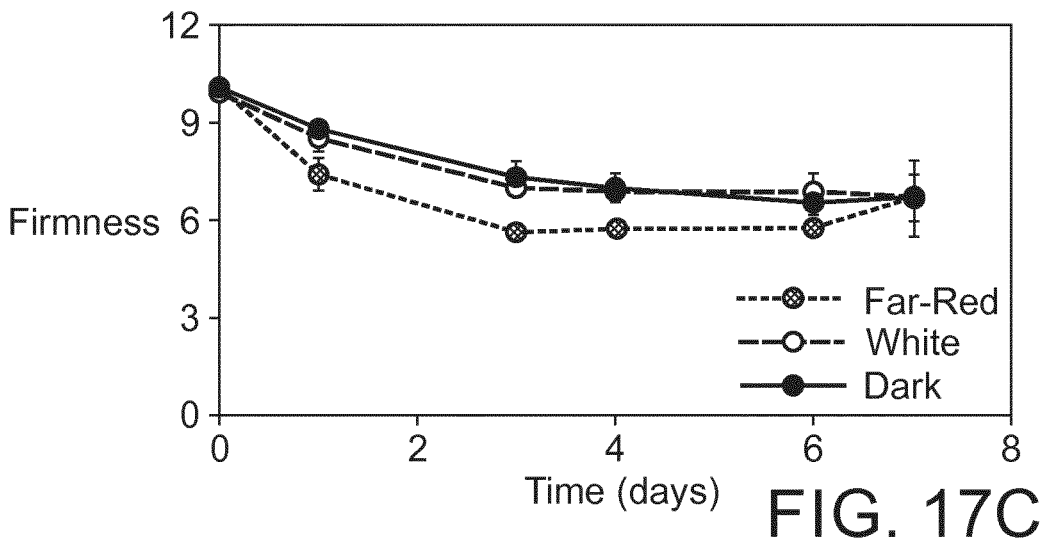

In yet a further experiment, NDVI, NAI and firmness were measure in dependence of illumination 24 h a day with a light intensity of 350 µmol m$^{-2}$ s$^{-1}$ with different light types (250 far red+100 white; 350 white only), in comparison to no illumination. The data are displayed in FIGS. 17a-17c. Far red radiations seems to promote the synthesis of lycopene (see also above). For fruit treated with far red we observed not only higher final lycopene content (results above) but also a quicker improvement for red color (NAI). Substantially no effect on green was observed (NDVI). The normalized difference vegetation index (NDVI) is a simple graphical indicator that can be used to analyze remote sensing measurements, typically but not necessarily from a space platform, and assess whether the target being observed contains live green vegetation or not. As indicated above, the normalized difference vegetation index NDVI=(I780-I660)/(I780+I660) and the Normalized anthocyanin index NAI=(I780-I570)/(I780+I570).

In view of those results, the the following is concluded:
  Monochromatic light alone is not ideal to induce changes in the nutrient (vitamins) of the tomato fruit;
  White light from white LEDs without UV and IR parts is the best for inducing a significant increase of vitamin C and other compounds;
  Far red light has a particular role. This light (700-800 nm) is not very efficient to increase most of nutrients (vitamin C, Lutein, Zeaxanthin, a- and b-carotenes, a- and d-tocopherol). However it seems that for Lycopene, this wavelength plays a particular role. Lycopene is also contributing to the coloration of the tomato as well as human health benefits. It is therefore maybe good to include a small dose of farred (1 to 20%) or the total PAR light provided from the white LEDs);
  Light should especially be provided 24 h per day for a minimum of about 96 hours, such as especially at least 168 hours, like 7 days and a maximum of about 240 hours, such as especially at maximum 10 days;
  White light appears to be better than sunlight because the UV compounds and infrared parts are not included;
  24 h illumination at a given intensity is needed to achieve significant increase of nutrients (about 300 µmol/s/m$^2$ being the most efficient intensity).

Figure 18:
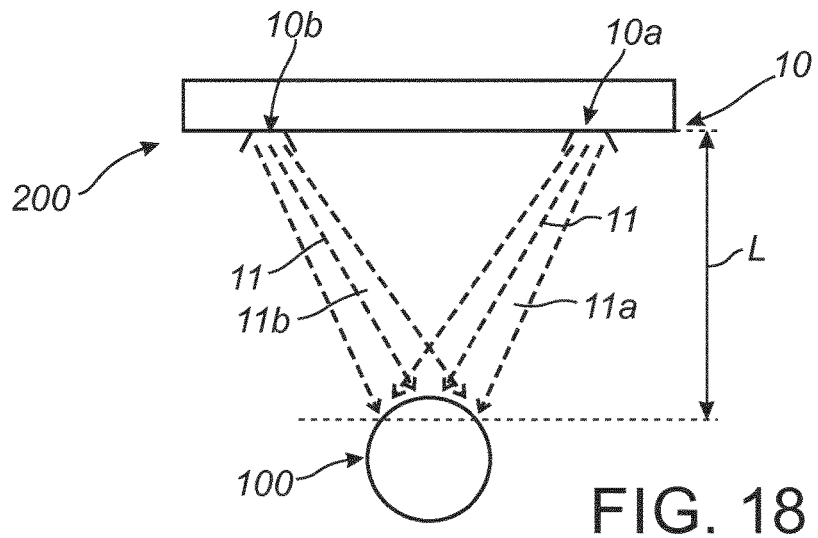
FIG. 18 schematically depicts some aspects of the invention.

FIG. 18 scheatmcially depicts a device 200 for ripening a piece of fruit 100, the device 200 comprising a light source 10 configured to generate radiation 11. Especially at least 90% of the total number of photons of the radiation 11 is in the range of 380-800 nm. Further, especially less 10% of the total number of photons of the radiation 11 are in the range of 700-800 nm. Yet further, especially at least 10% of the total number of photons together provide a white light component 11a of the radiation 11, such as with a first LED light source 10a. Here, the light source can provide white light 11a and also colored light 11b. Together they form the radiation 11. Note that only part of the piece of fruit 100 is irradiated with the radiation 11. In embodiments, the method may include turning one or more times the piece of fruit 100. The colored light 11b (component) may be provided with a second LED light source.

In specific embodiments the device 200 is configured to generate said radiation 11 with a predetermined intensity of at least 100 µmol/m$^2$/s at a distance L from said light source 10, wherein said distance is selected from the range of 0.1-3 m. Here, the area ("m$^{-2}$" or "/m$^2$") indicates the area of the piece of fruit that receives the radation.

Figure 19A:
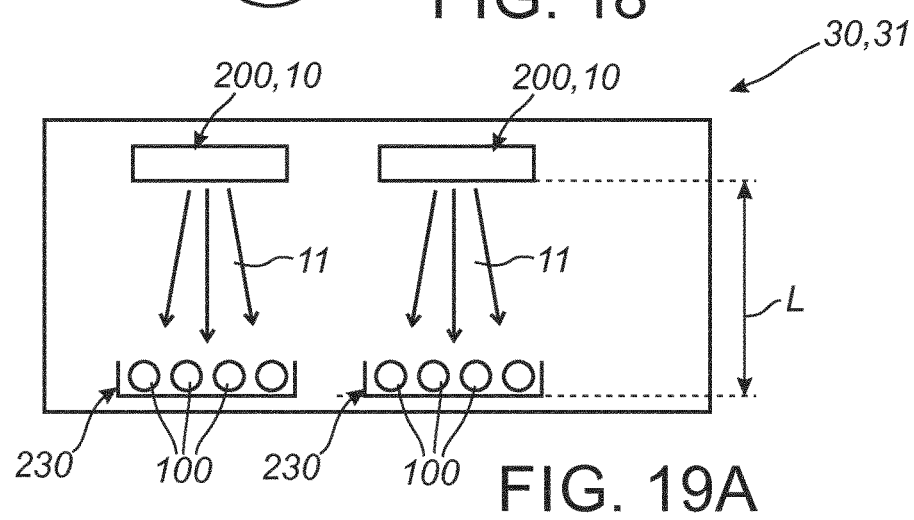
FIGS. 19a-19c schematically depict some variants and embodiments.
Figure 19B:
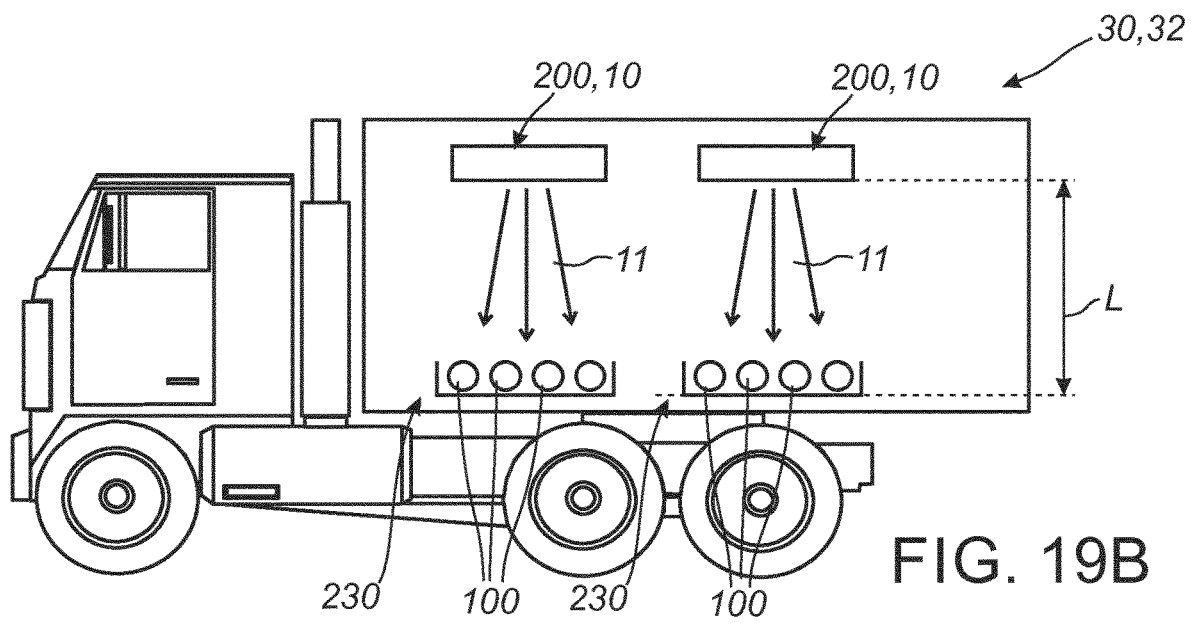

FIGS. 19a and 19b schematically depict embodiments comprising irradiating said at least part of the piece of fruit 100 in a storage facility 31 and/or comprising irradiating said at least part of the piece of fruit 100 in a mobile transport device 32. FIG. 19a schematically depicts a storage facility 31 as space 30 wherein the fruit is irradiated with radation 11. For instance, the storage facilty may be a ripening cell at an auction site. FIG. 19b schematically depicts a mobile transport device 32 as providing a space 30 wherein the fruit is irradiated with radation 11.

Figure 19C:
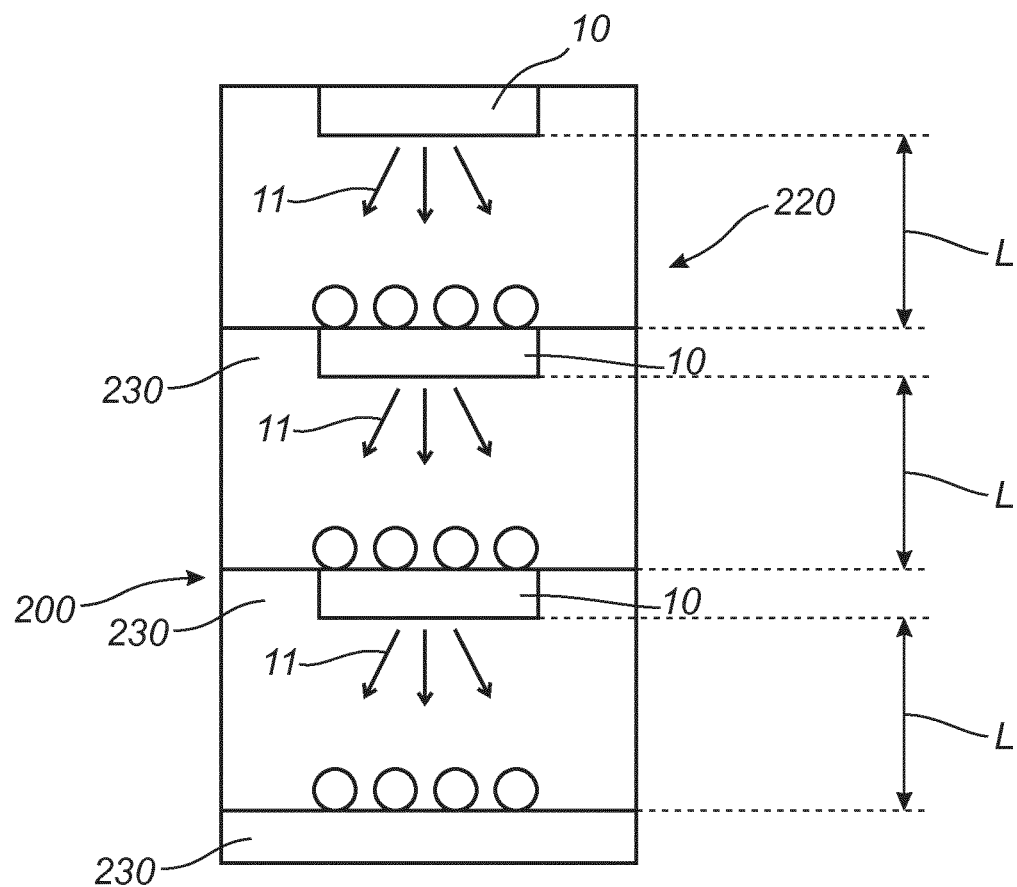

FIG. 19c schematically depicts an embodiment of the device 200 wherein the device comprises a rack 220 configured to host a plurality of support elements 230 over each other, wherein each support element 230 are configured to support one or more pieces of fruit 100. The device 200 comprises a plurality of said light sources 10 dedicated to the plurality of support elements 230, respectively. Light sources may be configured to a back side of a support. The supports are configured at distances from each other, allowing the fruits and light source be arranged and configured on and over the respective support, respectively. This device may e.g. be based on the device described in U.S. Pat. No. 8,181,387, which is herein incorporated by reference. Choosing the support element 230 at a distance L wherein the support element receives the indicated minimum radiation intensity will automatically provide the required minimum radiation intensity to the piece of fruit in or on the support element.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A method of post-harvest light treatment for increasing the ascorbic acid content of fruit, the method comprising:
   providing a harvested unripe piece of fruit;
   irradiating at least part of the harvested unripe piece of fruit with radiation with a predetermined minimum radiation intensity and during a predetermined continuous radiation period;
   wherein
   at least 90% of the total number of photons of the radiation are in the range of 380-800 nm, wherein less than 10% of the total number of photons of the radiation are in the range of 700-800 nm, and wherein at least 30% of the total number of photons together provide a white light component of the radiation;
   wherein the average radiation intensity with which the piece of fruit is irradiated by said irradiating over the predetermined radiation period is at least 100 µmol/m$^2$/s for the piece of fruit, and wherein the predetermined radiation period is at least 48 hours.

2. The method according to claim 1, wherein the piece of fruit is selected from the group consisting of a tomato, an apple and a bell pepper.

3. The method according to claim 1, wherein the piece of fruit is a tomato, and wherein the unripe piece of fruit comprises a tomato in the breaker stage or in a pre-breaker stage.

4. The method according to claim 1, wherein the predetermined radiation period is part of a given radiation period in the range of 96-216 hours, wherein the piece of fruit is irradiated during at least 80% of the given irradiation period and wherein the average radiation intensity with which the piece of fruit is irradiated over the given radiation period is in the range of 150-350 µmol/m$^2$/s.

5. The method according to claim 1, wherein at least 90% of the total number of photons of the radiation are in the range of 380-700 nm, and wherein less than 5% of the total number of photons of the radiation is in the range below 380 nm.

6. The method according to claim 1, wherein the radiation is white light enriched with light having one or more colors selected from the group blue, green, yellow, orange, and red.

7. The method according to claim 1, further comprising detaching the unripe piece of fruit from its plant to provide said unripe piece of fruit detached from a plant.

8. The method according to claim 1, wherein the fruit is a cluster fruit, and wherein the unripe piece of fruit is provided detached from a cluster.

9. The method according to claim 1, comprising irradiating said at least part of the piece of fruit in a storage facility and/or comprising irradiating said at least part of the piece of fruit in a mobile transport device.

* * * * *